US00RE51073E

(19) United States
(12) Reissued Patent
Fujimoto

(10) Patent Number: US RE51,073 E
(45) Date of Reissued Patent: *Oct. 13, 2026

(54) MEMORY DEVICE AND CONTROLLING METHOD OF THE SAME

(71) Applicant: KIOXIA CORPORATION, Tokyo (JP)

(72) Inventor: Akihisa Fujimoto, Yamato (JP)

(73) Assignee: KIOXIA CORPORATION, Tokyo (JP)

( * ) Notice: This patent is subject to a terminal disclaimer.

(21) Appl. No.: 18/439,893

(22) Filed: Feb. 13, 2024

Related U.S. Patent Documents

Reissue of:
(64) Patent No.: 9,110,781
Issued: Aug. 18, 2015
Appl. No.: 13/158,126
Filed: Jun. 10, 2011

U.S. Applications:
(63) Continuation of application No. 17/377,952, filed on Jul. 16, 2021, now Pat. No. Re. 49,921, which is a
(Continued)

(30) Foreign Application Priority Data

Dec. 11, 2008 (JP) ..... 2008-316066

(51) Int. Cl.
*G06F 12/00* (2006.01)
*G06F 12/02* (2006.01)
(Continued)

(52) U.S. Cl.
CPC .. *G06F 12/0246* (2013.01); *G06F 2212/7202* (2013.01)

(58) Field of Classification Search
CPC ..... G06F 12/0246; G06F 2212/7202; G06F 3/0616; G06F 3/0679; G06F 3/0656;
(Continued)

(56) References Cited

U.S. PATENT DOCUMENTS 5,745,418 A * 4/1998 Ma ..... G06F 3/0656 365/189.16
6,230,245 B1 * 5/2001 Manning ..... G11C 11/4076 365/230.01
(Continued)

FOREIGN PATENT DOCUMENTS

CN 1516835 A 7/2004
CN 1950803 A 4/2007
(Continued)

OTHER PUBLICATIONS

Extended European Search Report issued Jun. 6, 2012, in European Patent Application No. 09831999.9.
(Continued)

*Primary Examiner* — William H. Wood
(74) *Attorney, Agent, or Firm* — Oblon, McClelland, Maier & Neustadt, L.L.P.

(57) ABSTRACT

A memory device includes a memory which has memory areas, and a controller has a first mode and a second mode. Upon receipt of write data, the controller writes data in the memory areas while managing correspondence between logical addresses of write data and memory areas which store corresponding write data. A plurality of the memory areas constitutes a management unit. The controller in the first mode is able to write pieces of data in respective memory areas and configured to maintain data in memory areas in one management unit which contains data to be updated. The controller in the second mode writes pieces of data in respective memory areas in the ascending order of logical addresses of the pieces of data and invalidates data in memory areas in one management unit which contains updated data.

5 Claims, 38 Drawing Sheets

Related U.S. Application Data continuation of application No. 15/464,095, filed on Mar. 20, 2017, now Pat. No. Re. 48,983, which is an application for the reissue of Pat. No. 9,110,781, which is a continuation of application No. PCT/JP2009/071069, filed on Dec. 11, 2009.

(51) Int. Cl.
*G06F 13/00* (2006.01)
*G06F 13/28* (2006.01)

(58) Field of Classification Search
CPC ..... G06F 2212/7203; G06F 13/1684; G11C 13/0004; G11C 16/102; G11C 2216/30
USPC ..... 711/154, E12.001
See application file for complete search history.

(56) References Cited

U.S. PATENT DOCUMENTS

| | | | | |
|---|---|---|---|---|
| 6,438,635 | B1 * | 8/2002 | Date et al. | 710/113 |
| 6,480,916 | B1 * | 11/2002 | Shishizuka et al. | 710/107 |
| 6,480,936 | B1 * | 11/2002 | Ban et al. | 711/118 |
| 6,604,151 | B1 * | 8/2003 | Date et al. | 710/14 |
| 6,697,898 | B1 * | 2/2004 | Shishizuka et al. | 710/107 |
| 6,850,995 | B1 * | 2/2005 | Shishizuka et al. | 710/20 |
| 7,457,897 | B1 * | 11/2008 | Lee | G06F 13/1684 710/72 |
| 7,877,569 | B2 * | 1/2011 | Honda | G06F 3/0679 711/202 |
| RE44,052 | E * | 3/2013 | Kim | G06F 12/0246 711/170 |
| RE48,983 | E * | 3/2022 | Fujimoto | G06F 12/0246 |
| RE49,921 | E * | 4/2024 | Fujimoto | G06F 12/0246 |
| 2005/0080985 | A1 | 4/2005 | Sasaki | |
| 2005/0240813 | A1 * | 10/2005 | Okada et al. | 714/14 |
| 2006/0059384 | A1 * | 3/2006 | Helliker | 714/13 |
| 2007/0067598 | A1 | 3/2007 | Fujimoto | |
| 2008/0071969 | A1 * | 3/2008 | Lin | G06F 12/0246 711/159 |
| 2008/0109589 | A1 | 5/2008 | Honda | |
| 2009/0282203 | A1 * | 11/2009 | Haustein et al. | 711/162 |
| 2010/0299312 | A1 * | 11/2010 | Suryanarayanan et al. | 707/645 |
| 2012/0254524 | A1 * | 10/2012 | Fujimoto | 711/103 |
| 2013/0173857 | A1 * | 7/2013 | Cheon | G06F 12/0246 711/103 |

FOREIGN PATENT DOCUMENTS

| | | | |
|---|---|---|---|
| EP | 1 498 817 | A1 | 1/2005 |
| EP | 1 746 510 | A1 | 1/2007 |
| JP | 2006-99210 | | 4/2006 |
| JP | 2006-178923 | | 7/2006 |
| TW | I220250 | B | 8/2004 |
| TW | 200837562 | A | 9/2008 |
| TW | I340899 | B | 4/2011 |
| WO | WO 2008/033952 | A2 | 3/2008 |
| WO | WO 2009/013877 | A1 | 1/2009 |

OTHER PUBLICATIONS

International Search Report mailed Mar. 30, 2010 in PCT/JP2009/071069 dated Dec. 11, 2009.

International Written Opinion mailed Mar. 30, 2010 in PCT/JP2009/071069 dated Dec. 11, 2009.

Combined Office Action and Search Report issued Apr. 23, 2013 in Taiwanese Application No. 098142639 (With English Translation).

Combined Chinese Office Action and Search Report issued Aug. 26, 2013, in Chinese Patent Application No. 200980149510.2 with English translation and English translation of category of cited documents.

Office Action issued Apr. 28, 2015, in Chinese Patent Application No. 200980149510.2 (with English-language Translation).

* cited by examiner

MEMORY DEVICE AND CONTROLLING METHOD OF THE SAME

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*More than one reissue application has been filed for the reissue of U.S. Pat. No. 9,110,781. These applications are the present application; application Ser. No. 17/377,952 filed Jul. 16, 2021, now RE49,921; and application Ser. No. 15/464,095 filed Mar. 20, 2017, now RE48,983. The present application is a reissue continuation of application Ser. No. 17/377,952, which is a reissue continuation of application Ser. No. 15/464,095.*

CROSS REFERENCE TO RELATED APPLICATIONS

This is a Continuation Application of PCT Application No. PCT/JP2009/071069, filed Dec. 11, 2009, which was published under PCT Article 21(2) in English.

This application is based upon and claims the benefit of priority from prior Japanese Patent Application No. 2008-316066, filed Dec. 11, 2008, the entire contents of which are incorporated herein by reference.

BACKGROUND OF THE INVENTION

1. Field of the Invention

The present invention relates to a memory device and a controlling method of the memory, and in particular to a memory device a nonvolatile semiconductor memory.

2. Description of the Related Art

Memory devices, such as a memory card, are used as a media for storing music data or video data. They devices use nonvolatile semiconductor memories, such as flash memories. Memory devices typically include a controller for controlling the memory. A file system of a host into which such a memory device is inserted assigns logical addresses to data, and requests the memory device to write this data. The controller instructs the flash memory to store the write data in free memory areas. Moreover, the controller manages relation between logical addresses assigned to data by the file system, and memory areas in the flash memory which store the corresponding data.

Typical examples of the flash memory used for memory devices include a NAND flash memory. In the NAND flash memory, data is written in the unit called a page which consists of more than one bits. The NAND flash memory can erase data only in the unit called a block which consists of more than one pages.

A user may want to know performance of the memory device through the host device. Such performance includes recording speed, time required for record, recordable time, etc. A technique for predicting such performance is described in Jpn. Pat. Appln. KOKAI Publication No. 2006-178923. This technique uses the following principles.

As described above, the NAND flash memory can erase data only in the unit of block. That is, it cannot overwrite data. In order to update data in the memory, a new block needs to be prepared, the data not to be updated needs to be copied in the new block, and the data to be updated needs to be written in the new block. For this reason, data in the flash memory is written fast in continuous free pages, and slowly written in a block including pages storing data and ones without data. That is, data write speed varies according to distribution of written pages in a block (fragmentation). Using this, the write speed of each block is calculated, and recordable time of the memory device is calculated from the number of blocks which satisfy the write speed required by application in a host which will store data in the memory device. However, such a technique using fragmentation requires complicated calculation of performance, and a long time for execution. For this reason, a need arises for the memory device which allows for simpler performance prediction.

Moreover, the increased memory capacity, improved memory device performance, and diversified contents required to be recorded by the user generate a variety of types of usage of memory devices. For example, a request arises for recording two videos such as two TV programs, or recording a picture while recording videos. It is, however, impossible to fulfill the demand to write data for multiple files in parallel into the memory device in real time because the inability of data overwrite requires the above-mentioned data copy, which takes a long time to result in a low speed of writing accompanied by data copy.

BRIEF SUMMARY OF THE INVENTION

According to an aspect of the present invention, there is provided a memory device comprising: a memory which has memory areas; and a controller configured to, upon receipt of write data, write data in the memory areas while managing correspondence between logical addresses of write data and memory areas which store corresponding write data, and which has a first mode and a second mode, wherein a plurality of the memory areas constitutes a management unit, the controller in the first mode is able to write pieces of data in respective memory areas and configured to maintain data in one or more memory areas in one management unit which contains data to be updated, the controller in the second mode is configured to write pieces of data in respective memory areas in the ascending order of logical addresses of the pieces of data and configured to invalidate data in one or more memory areas in one management unit which contains updated data.

According to another aspect of the present invention, there is provided a memory device comprising: a memory which has memory areas; and a controller configured to, upon receipt of write data, write data in the memory areas while managing correspondence between logical addresses of the write data and memory areas which store corresponding write data, configured to recognize a logical address group which consists of successive logical addresses, and configured to, upon receipt of a first command, shift to a real-time write enable mode, wherein upon receipt of a data writing instruction, the controller in the real-time write enable mode writes data in a work area temporarily prepared for a logical address group which contains the logical address of the write data in the ascending order of logical addresses of pieces of the write data, and assigns a logical address to the work area after completion of data writing to the last memory area in the work area.

According to another aspect of the present invention, there is provided a method of controlling a memory device comprising memory areas, the method comprising: upon receipt of write data, writing data in the memory areas while managing correspondence between logical addresses of the write data and memory areas which store corresponding write data; in a first mode, writing pieces of data in respective memory areas and maintaining data in one or more memory areas in one management unit which contains data to be updated, wherein a plurality of the memory areas constitute one management unit; in a second mode, writing pieces of data in respective memory areas in the ascending order of logical addresses of the pieces of the pieces of data and invalidating data in one or more memory areas in one management unit which contains updated data.

DETAILED DESCRIPTION OF THE INVENTION

Embodiments of the present invention will now be described with reference to drawings. In the following, the same components are indicated with the same reference numbers throughout the figures, and repetitive description will be given only when required. Note that drawings are merely illustrative.

In the following, description will be given of a memory device according to embodiments of the present invention with a memory card, in particular SD card, taken as an example. Any memory device that has a memory and a controller for controlling thereof which is described herein is, however, included within the scope of the present invention.

First Embodiment

[1] Configuration

Figure 1:
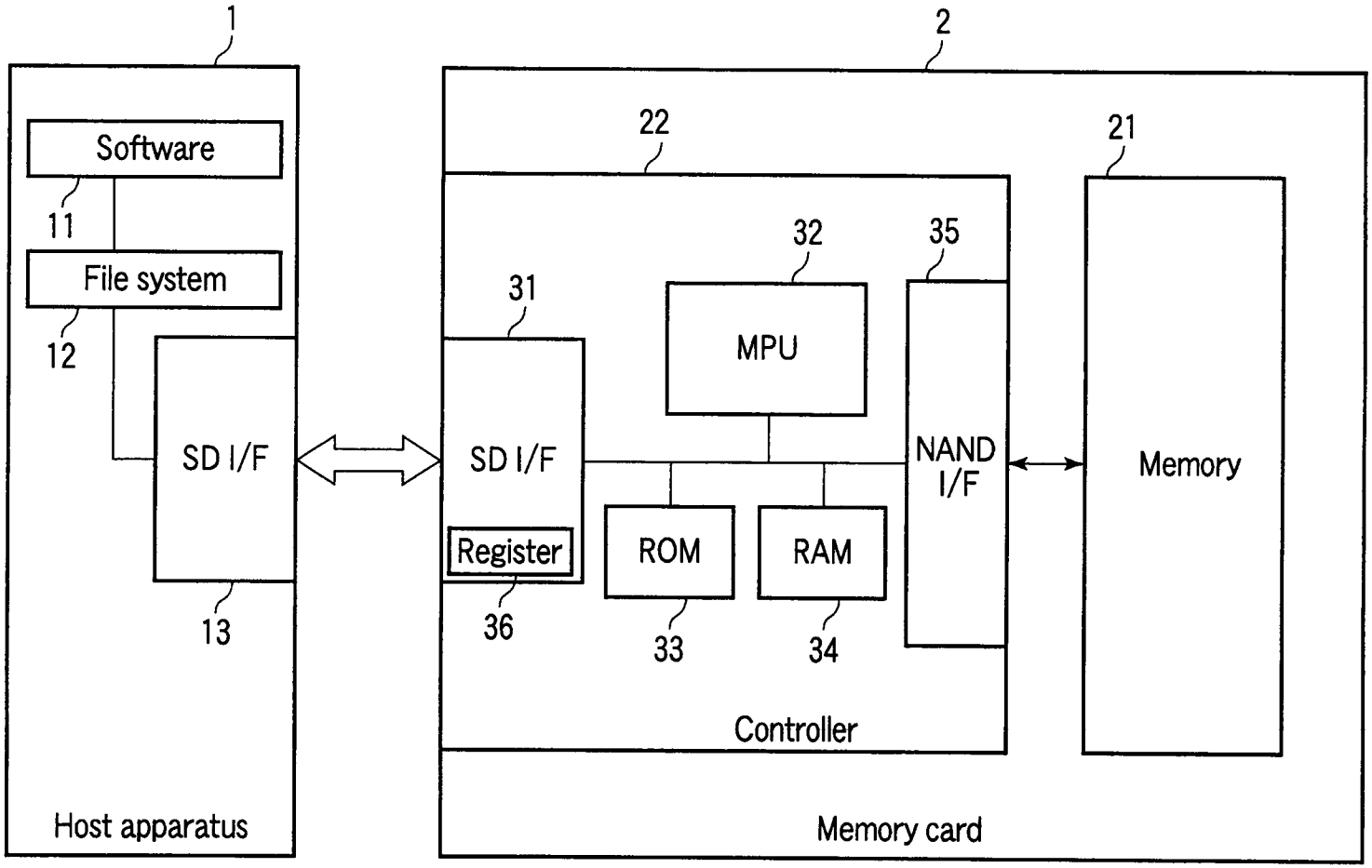
FIG. 1 illustrates main functional blocks of a memory card according to a first embodiment with functional blocks of a host device.

Configuration of the memory card according to the first embodiment of the present invention will be described with reference to FIGS. 1 to 4. FIG. 1 illustrates main functional blocks of the memory card according to the first embodiment. FIG. 1 also illustrates functional blocks of a host device connected to this memory card. Each functional block can be implemented as hardware, computer software, or a combination of the both. To clearly illustrate this interchangeability of hardware and software, description will be given generally in terms of their functionality. Whether such functionality is implemented as hardware or software depends upon the particular application and design constraints imposed on the overall system. Those skilled in the art may implement the described functionality in varying ways for each particular application, but all variations should be included within the scope of the present invention.

The host device (referred to as a host hereinafter) 1 has software 11, such as application and/or an operating system. The software 11 is instructed by a user to write data to a memory card 2, and to read data therefrom. The software 11 instructs the file system 12 to write/read data 12. The file system 12 is mechanism for managing file data stored in storage medium, record management information in memory areas in the storage medium, and uses this management information to manage the file data.

The host 1 has an SD interface 13. The SD interface 13 consists of hardware and software to allow the host 1 to be interfaced with the memory card 2. The host 1 communicates with the memory card 2 via the SD interface 13. The SD interface 13 specifies various agreements for communication between the host 1 and the memory card 2. The SD interface 13 and the SD interface 31 of the memory card 2

(to be described later) provide various kinds of commands recognizable by both the interfaces. The SD interface 13 also includes hardware configuration (e.g., pin arrangement, number of pins, etc.) which can be connected to the SD interface 31.

The memory card 2 has a NAND flash memory 21 and a controller 22 for controlling the memory 21. The memory card 2 starts to receive power, when connected to the host 1 or when the host 1 is turned on with the memory card 2 inserted, to perform initialization and then processing according to access from the host 1.

The memory 21 nonvolatily stores data, and writes and reads data in the unit called a page which consists of multiple memory cells. A page has a physical address unique to the page. The memory 21 erases data in the unit called a physical block (erase block) which consists of multiple pages. A physical address may be assigned to a physical block.

The controller 22 manages data storage state in the memory 21. Management of memory states includes management between a physical address of a page (or a physical block) and a logical address of data stored in the page, and which page (or physical block) contains no data or invalid data.

The controller 22 includes the SD interface 31, micro processing unit (MPU) 32, read only memory (ROM) 33, random access memory (RAM) 34, and NAND interface 35. The SD interface 31 consists of hardware and software to allow the host 1 to be interfaced with the controller 22.

The SD interface 31 specifies agreements which enable communication with the SD interface 13, includes various kinds of commands, and includes hardware configuration (e.g., a pin arrangement, and the number of pins, etc.), as the SD interface 13. The memory card 2 (controller 22) communicates with the host 1 via the SD interface 31. The SD interface 31 includes a register 36.

The MPU 32 manages the overall operation of the memory card 2. The MPU 32 reads firmware (control program) stored in the ROM 33 onto the RAM 34 to perform predetermined processing when, for example, the memory card 2 starts to receive power. The MPU 32 creates various kinds of tables (to be described later) on the RAM 34 according to the control program and performs predetermined processing to the memory 21 according to commands received from the host 1.

The ROM 33 stores the control program for the MPU 32, etc. The RAM 34 is used as a work area for the MPU 32, and temporarily stores control programs and various kinds of tables. The tables include a translation table (logical/physical table) of a physical address of a page which stores data with a logical address assigned by the file system 12. The NAND interface 35 allows the controller 22 to be interfaced with the memory 21.

Memory areas in the memory 21 include, for example, a system data area, a security data area, a protected data area, a user data area, etc., defined in accordance with a type of stored data. The system data area is reserved by the controller 22 for storing data required for its operation. The security data area stores key information for encryption and security data for authentication, and is inaccessible by the host 1. The protected data area stores important data and secure data. The user data area can be accessed and used by the host 1, and stores, for example, user data, such as AV content files and image data. When the description "the memory 21" is used to refer to the memory space of the memory 21, it refers to the user data area. The controller 22 reserves a part of the user data area, where it stores control data (e.g., logical/physical table) required for its own operation.

Figure 2:
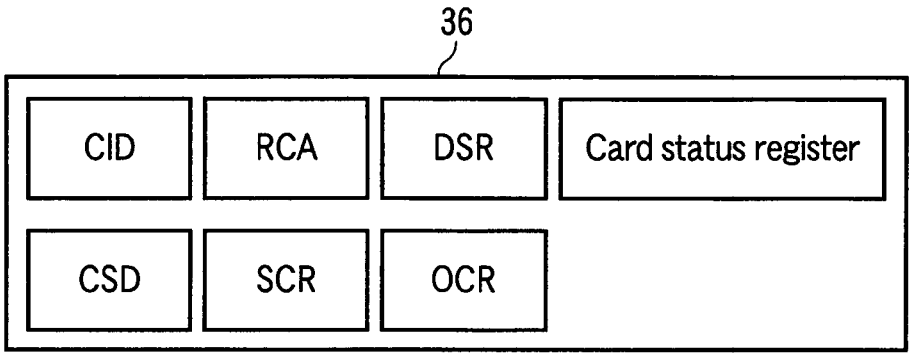
FIG. 2 illustrates details of a register.

The register 36 has various registers, such as a card status register, CID, RCA, DSR, CSD, SCR, and OCR as illustrated in FIG. 2. These registers store error information, an individual number of the memory card 2, a relative card address, bus driving power of the memory card 2, characteristics parameter values of the memory card 2, data arrangement, and operating voltage, if any, defined by operation voltage range of the memory card 2, etc.

The register 36 (for example, CSD) stores a class of the memory card 2, the time required for data copy, an AU size, etc. The class is defined by the minimum write speed guaranteed by the memory card belonging to this class. The highest write speed is determined by the class. Therefore, the host 1 can read the data indicative of the AU size from the register 36 to use this information for the management of the memory card 2, and can read the data indicative of the class from the register 36 to learn the maximum write performance of the memory card 2. Moreover, the CSD may further store performance information, such as performance information described in Jpn. Pat. Appln. KOKAI Publication No. 2006-178923.

Figure 3:
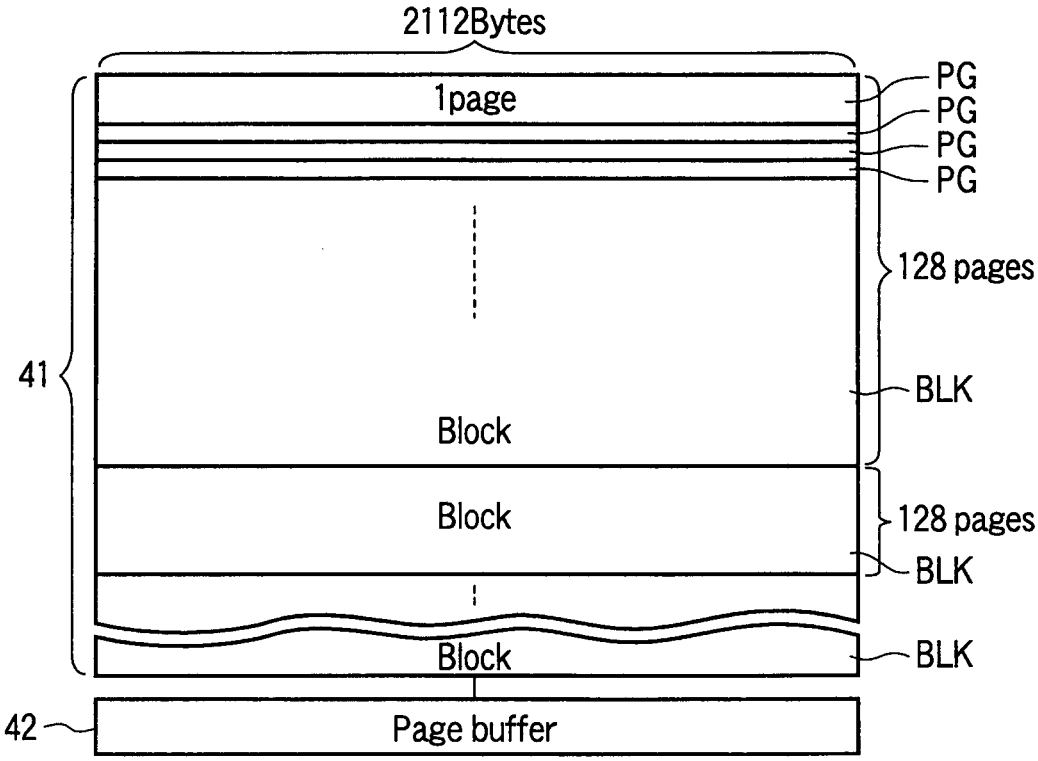
FIG. 3 illustrates configuration of memory space.

FIG. 3 illustrates a configuration of the memory space of the memory 21. As shown in FIG. 3, the memory 21 has normal memory areas 41 and a page buffer 42. The memory area 41 includes multiple physical blocks BLK. Each physical block BLK consists of multiple pages PG. Each page PG includes serially-connected memory cell transistors.

Each memory cell consists of a so-called stacked-gate metal oxide semiconductor field effect transistor (MOSFET). Each memory cell transistor stores information according to its threshold voltage which varies according to the number of electrons captured in a floating gate electrode. The memory 21 may be configured so that a memory cell transistor can take more than two different threshold voltages, that is, a memory cell can store multiple levels (multiple bits).

Control gate electrodes of the memory cell transistors belonging to the same row are connected to the same word line. Selection gate transistors are provided in the both ends of a chain of serially-connected memory cell transistors which belong to the same column. One of the selection gate transistors is connected to a bit line. Data is written or read in a unit of the set of the serially-connected memory cell transistors. The memory area which consists of this set of the memory cell transistors corresponds to one page.

In an example of FIG. 3, each page PG has 2112 B, for example, and each block 52 consists of 128 pages. Data is erased in the unit of the block BLK. The page buffer 34 inputs/outputs the data from/to the memory 21, and temporarily holds the data. The data size which can be held by the page buffer 42 is the same as that of the page PG, i.e., 2112 B (2048 B+64 B).

Figure 4:
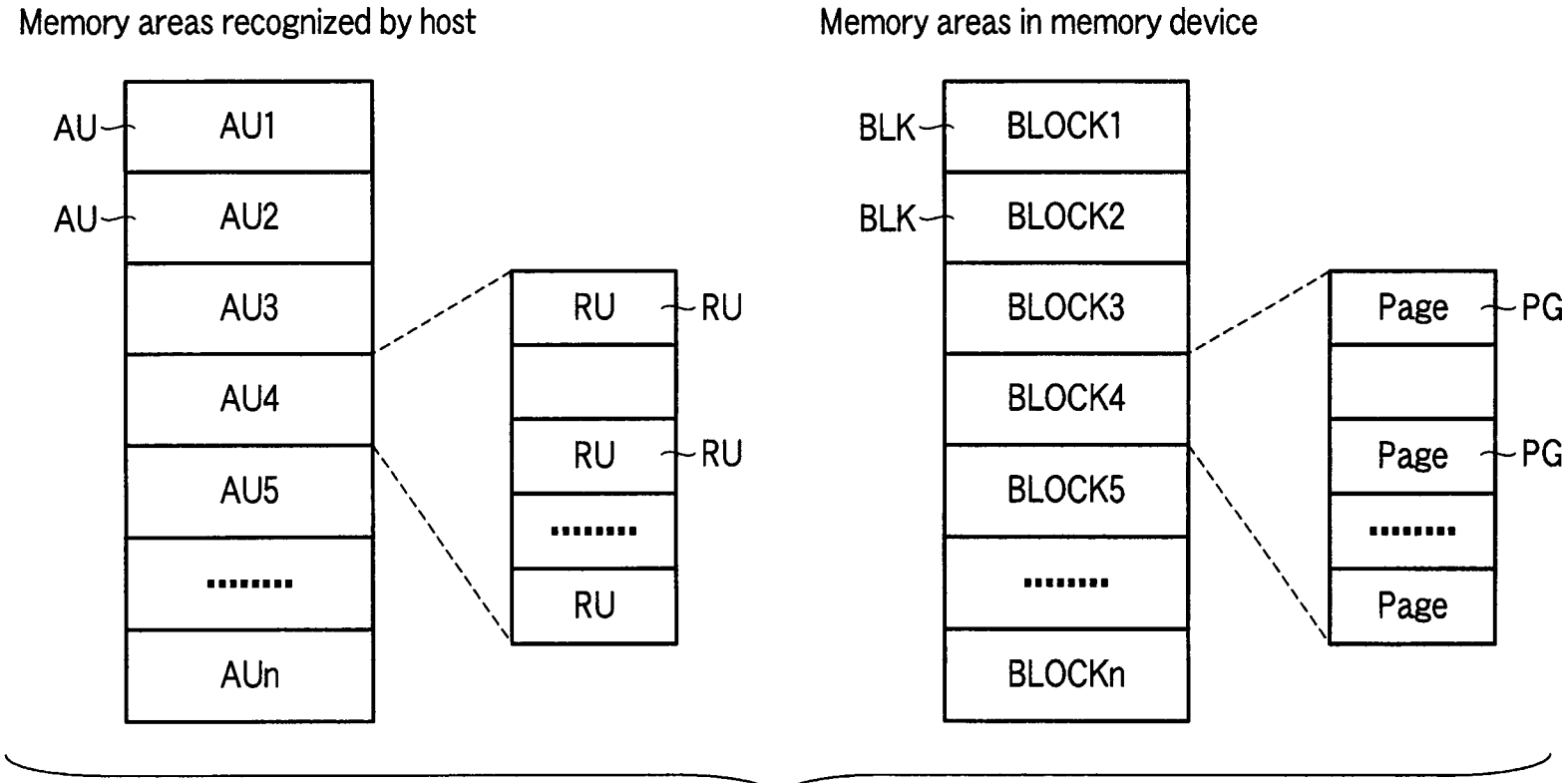
FIG. 4 illustrates memory areas recognized by the host and memory areas of the memory card.

As illustrated in FIG. 4 and described above, the memory 21 writes or reads data in the unit of the page PG, and erases data in the unit of the block BLK. On the other hand, the file system 12 manages data in the unit of a recording unit (RU). That is, the file system 12 divides the data write-requested by the software 11 into segments of a suitable size according to the size of the RU, and assigns a logical address to each segment. The RU is equivalent to a piece of data which is written into with one multi-block write command. The file system 12 supplies the data assigned a unique logical address as the write data to the memory card 2 after a write command. The controller 22 writes the write data in suitable pages. The size of the RU is an integral multiple of a page capacity. Therefore, the memory card 2 writes the write data of the RU size in pages which have sequential physical addresses. Note that since the RU has a correspondence with the unique logical address managed by the file system, assigning data to the RU means assigning a logical address to the data. The file system 12 uses the table to manage the connecting relation of segments of the data, and uses this relation to restore the original data by connecting the segments. The controller 22 uses the translation table (logical/physical table) to manage correspondence between a logical address and an address of a page (physical address) which stores the data of this logical address.

The file system 12 also uses a concept of AU (allocation unit) which consists of a predetermined number of sequential RUs which belong to a predetermined range. The controller 22 can recognize the boundary of the AU by looking at high bits of the logical address of the data. An AU size is an integral multiple of the block (physical block) capacity. Thus, the RU size is equal to the size of combined pages, and the AU size is equal to the size of combined blocks. For this reason, description will be given with the RU and AU each used as a unit of a reading/writing of the data in the memory card 2 below. That is, the "RU" used for the memory card 2 means combined sequential pages of the same size as the RU, and the "AU" used for the memory card 2 means combined sequential blocks of the same size as the AU. Specifically, the data which the file system 12 assigned to an RU is stored in an RU in the memory card 2, the memory card 2 manages the RU (logical address) assigned to the data by the file system 12, and the RU in the memory 21 which stores this write data with a table.

[2] Operation

[2-1] First Example

Figure 5:
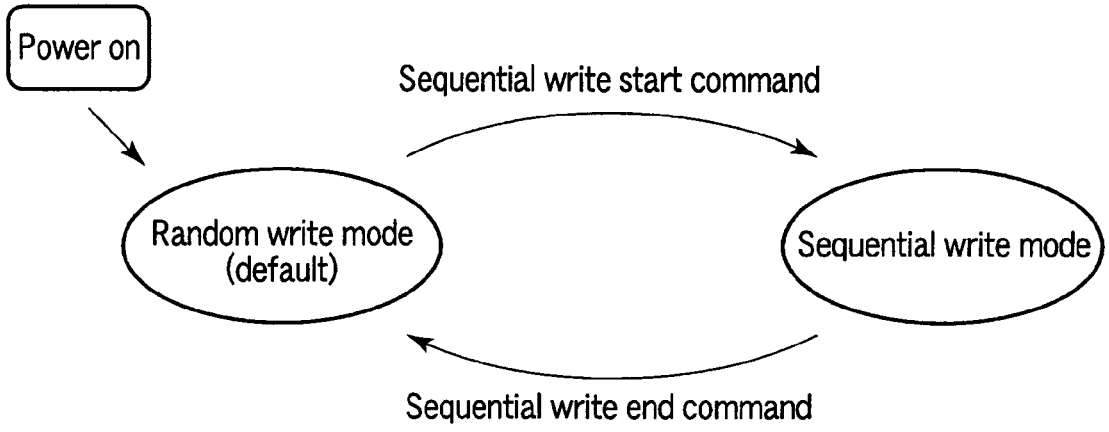
FIG. 5 illustrates transition of modes taken by the memory card of the first embodiment.
Figure 6:
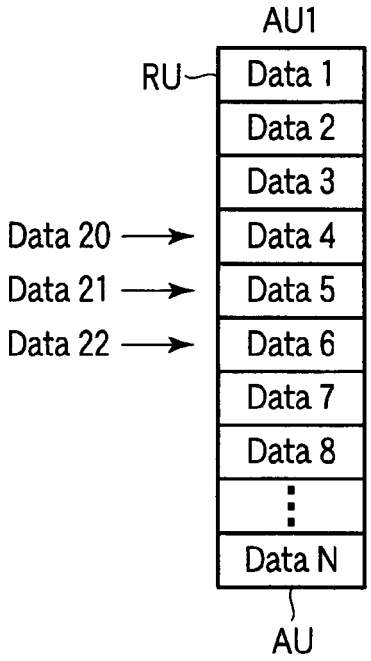
FIG. 6 illustrates a state in the memory card during writing for a first example of the first embodiment.

Referring to FIGS. 5 to 14, a part of operation of the memory card 2 will now be described first. FIG. 5 illustrates transition of modes taken by the memory card according to a first embodiment. As shown in FIG. 5, the memory card 2 has a random write mode and a sequential write mode. The controller 22 operates according to the current one of the two modes. The memory card 2 is in the random write mode when the power supply from the host 1 starts. The memory card 2 in the random write mode shifts to the sequential write mode when it receives a sequential write start command or it detects random write instruction by detecting non-successive logical addresses of write data. On the other hand, the memory card 2 in the sequential write mode will shift to the random write mode when it receives a sequential write end command. The SD interface 31 is configured to recognize the sequential write start command and sequential write end command.

Referring to FIGS. 6 to 9, the random write mode will now be described. FIGS. 6 to 9 illustrate in order one state during writing in the random write mode. AUs except for work AUs in FIGS. 6 to 9 represent AUs recognized by the file system 12, and also represent AUs of the memory card 2 which store the data in AUs recognized by the file system 12.

Figure 7:
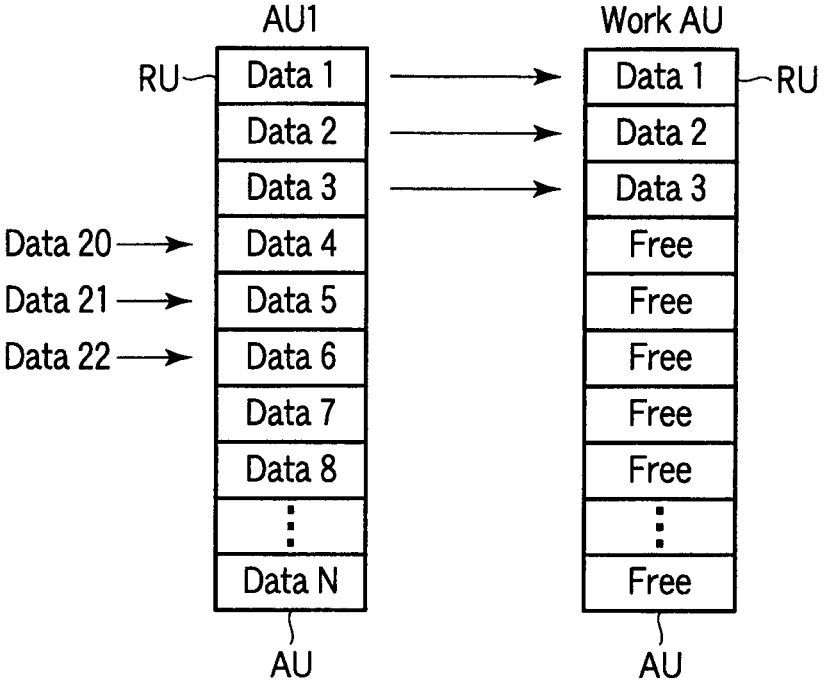
FIG. 7 illustrates a state following FIG. 6.

First, the first to Nth RUs belonging to AU1 in the memory card 2 store data 1 to N. In this state, the host 1 wishes to write data 20 to 22 in the fourth to sixth RUs in AU1. Since the flash memory 21, however, cannot carry out this update instruction directly by overwriting the data, it performs the following operations. First, as shown in FIG. 7, the memory card 2 (controller 22) prepares an AU for temporary work use (a work AU). Then, the memory card 2 copies data 1 to 3 to the same first to third RUs in the work AU as the RUs in AU1 whose data will not be updated, respectively.

Figure 8:
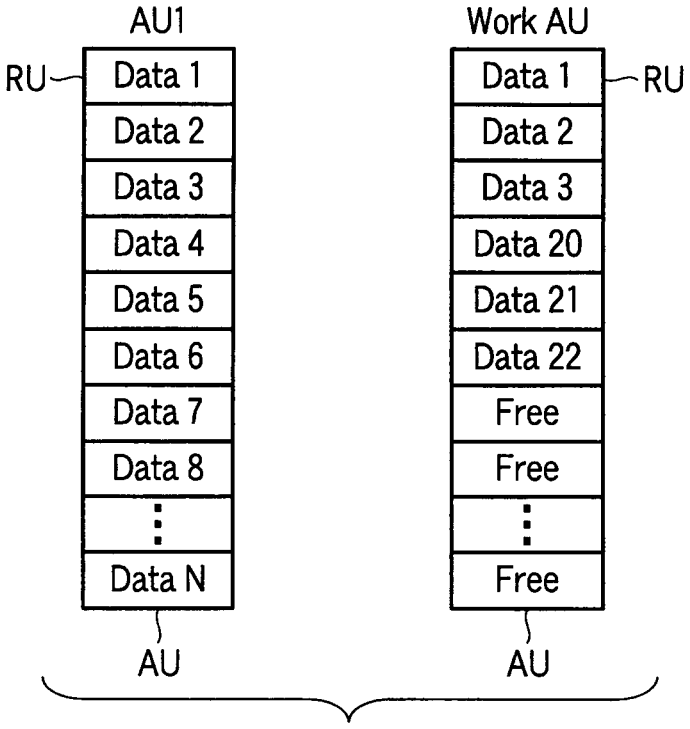
FIG. 8 illustrates a state following FIG. 7.

As shown in FIG. 8, the memory card 2 writes data 20 to 22 in the same fourth to sixth RUs in the work AU as the updated RUs in AU1 whose data will be updated.

Figure 9:
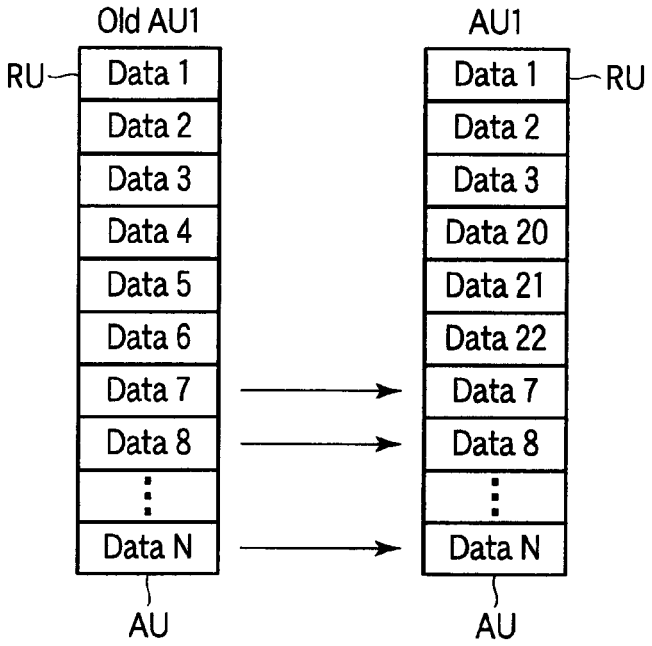
FIG. 9 illustrates a state following FIG. 8.

As shown in FIG. 9, the memory card 2 copies data 7 to N of AU1 to the same seventh to Nth RUs in the work AU as non-updated RUs in the work AU, respectively. Then, the memory card 2 carries out closing processing to work AU1. Closing processing refers to setting the work AU as AU1, more specifically, setting the work AU as an AU which stores the data in AU1 recognized by the file system 12, or rewriting the logical/physical table. At the same time, the old AU1 is discarded. In other words, the old AU1 will be dealt with as an AU which has invalid data. The data in the old AU is erased at a predetermined timing to make it a new free AU.

Figure 10:
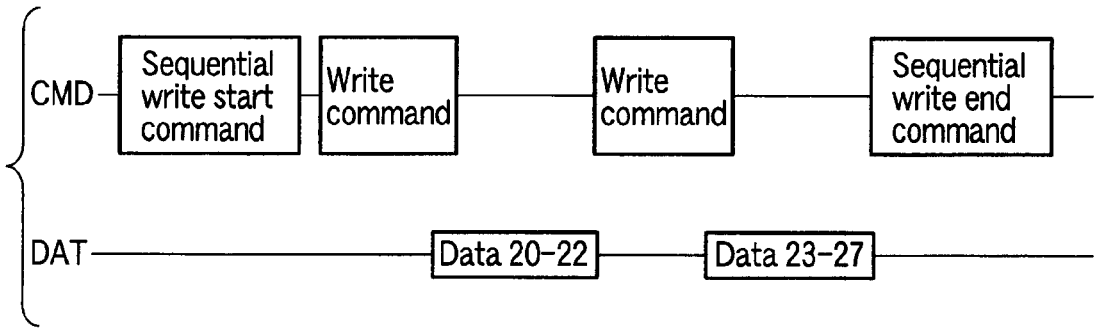
FIG. 10 illustrates a first example of commands and data received by the memory card of the first embodiment.

The sequential write mode will now be described with reference to FIGS. 10 to 14. FIG. 10 illustrates the first example of commands and data transmitted between the host 1 and the memory card 2 in the sequential write mode and before and after that. FIGS. 11 to 14 each sequentially illustrates a state during writing for the first example in the sequential write mode. AUs except for work AUs in FIGS. 11 to 14 represent AUs recognized by the file system 12, and also represent AUs of the memory card 2 which store the data in AUs recognized by the file system 12.

Figure 11:
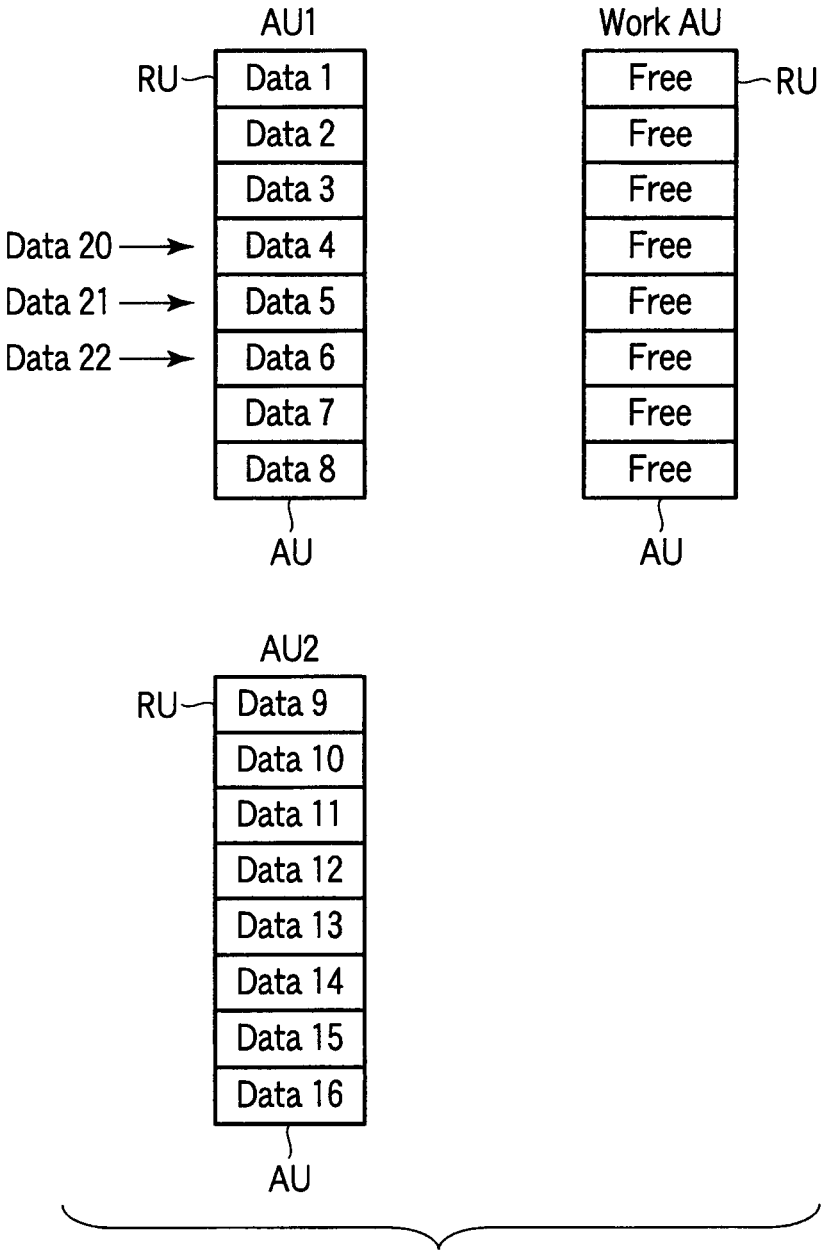
FIG. 11 illustrates a state in the memory card during writing for the first example of the first embodiment.

First, the memory card 2 is in the random write mode, and as shown in FIG. 11, the first to eighth RUs in AU1 respectively store data 1 to 8, and the first to eighth RUs in AU2 respectively store data 9 to 16. In this state, as shown in FIG. 10, the host 1 supplies the sequential write start command to the memory card 2. Upon receipt of this command, the memory card 2 shifts to the sequential write mode.

As shown in FIG. 11, the host 1 wishes to write data 20 to 22 in the fourth to sixth RUs in AU1. That is, the host 1 wishes to update the fourth to sixth RUs with data 20 to 22. In order to perform this writing, as shown in FIG. 10, the host 1 supplies the write command, and then data 20 to 22 associated with the fourth to sixth RUs in AU1 to the memory card 2. As shown in FIG. 11, upon receipt of this write request, the memory card 2 prepares a work AU1 for AU1. The work AU consists of only free RUs, and is used temporarily by the memory card 2 for internal use. In the sequential write mode, the memory card 2, in response to the write request, always prepares a free work AU and writes data in it. Since the original AU1 for the work AU is still effective, even if a write error occurs for some reason at this stage, the state before the writing can be restored.

In the sequential write mode, the data of the RU which will not be updated is not copied to the RU in the work AU. Therefore, as shown in FIG. 12, the memory card 2 respectively writes data 20 to 22 in the same fourth to sixth RUs in the work AU as the RUs in AU1 which are instructed to data 20 to 22.

Figure 12:
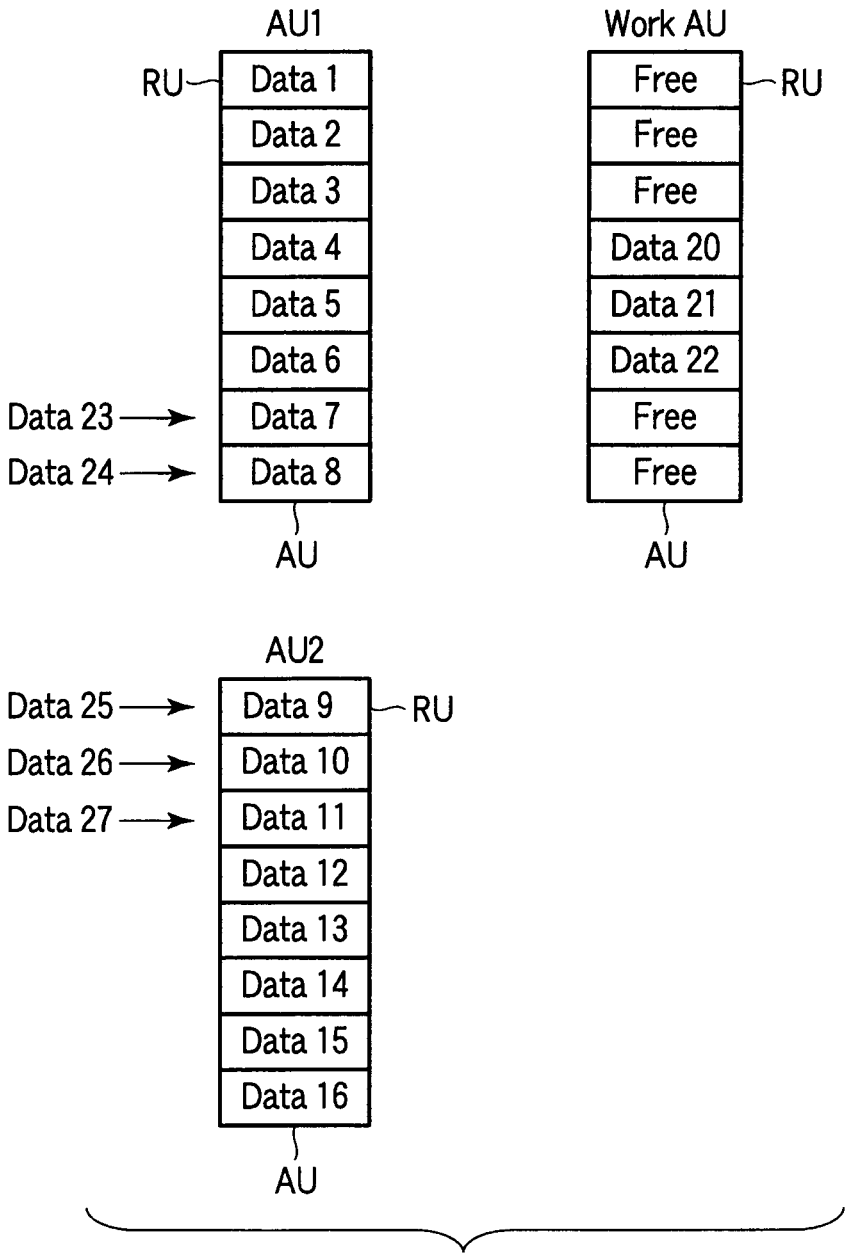
FIG. 12 illustrates a state following FIG. 11.
Figure 13:
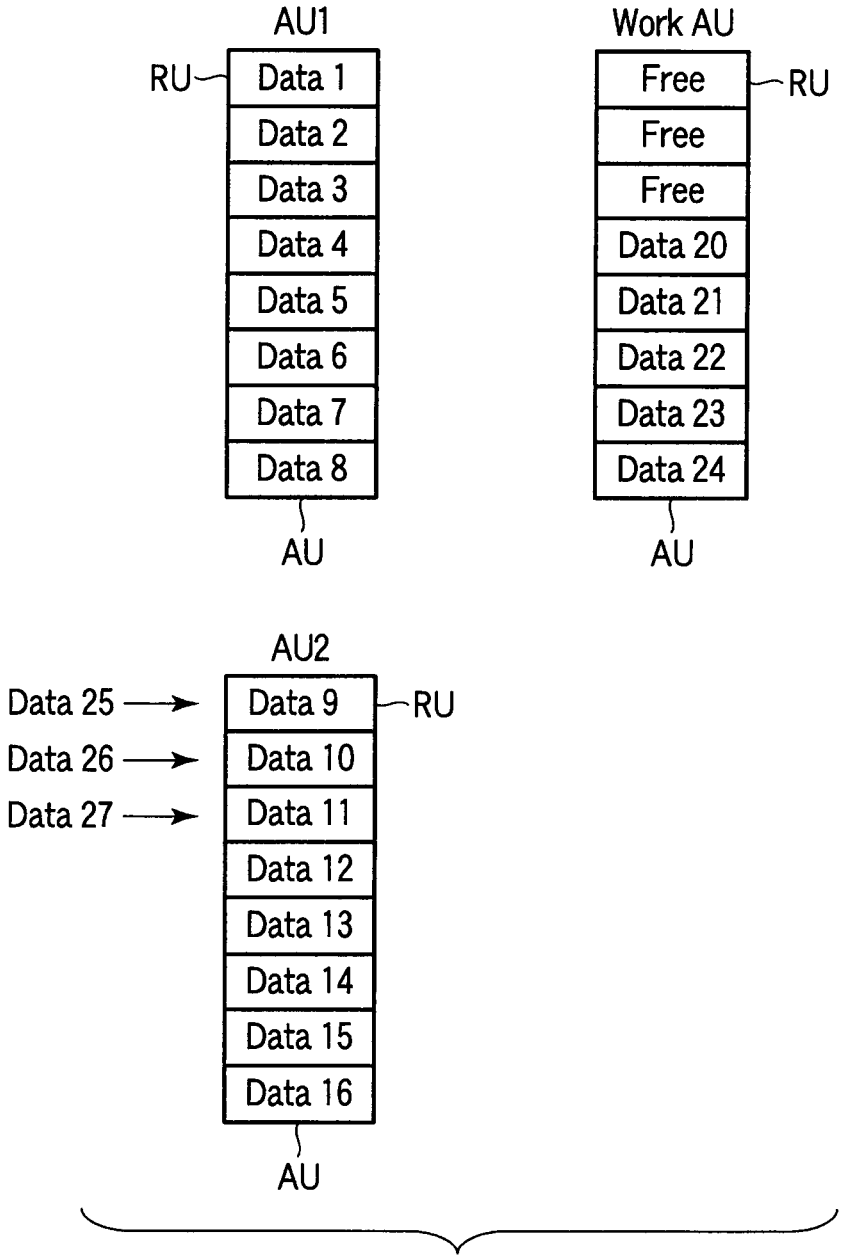
FIG. 13 illustrates a state following FIG. 12.
Figure 14:
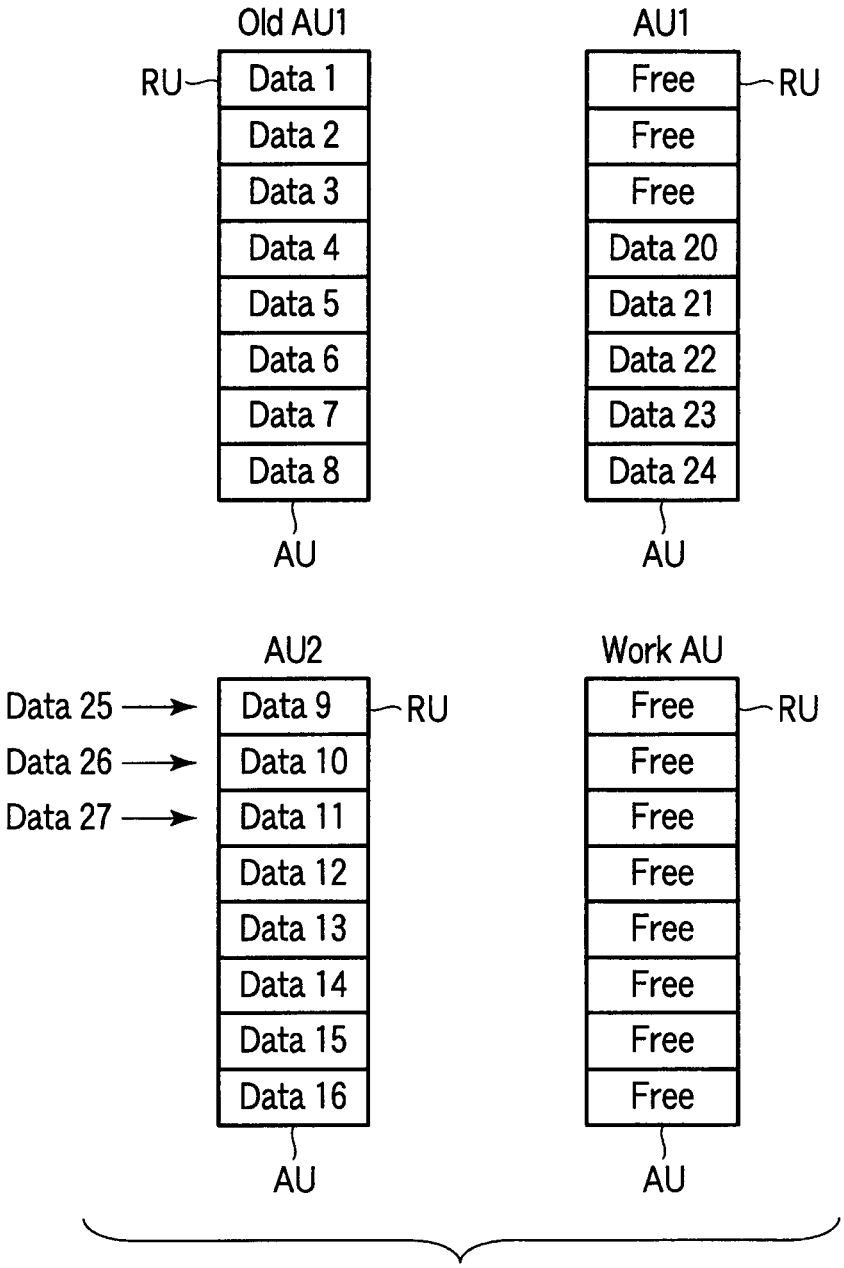
FIG. 14 illustrates a state following FIG. 13.

As shown in FIG. 12, the host 1 wishes to update data 7 and 8 in the seventh and eighth RUs in AU1 with data 23 and 24, and to update data 9 to 11 in the first to third RUs in AU2 with data 25 to 27. In order to perform this update, as shown in FIG. 10, the host 1 supplies the write command, data 23 and 24 associated with the seventh and eighth RUs in AU1, and data 25 to 27 associated with the first to third RUs in AU2 to the memory card 2. Upon receipt of this write request, as shown in FIG. 13, the memory card 2 respectively writes data 23 and 24 in the same seventh and eighth RUs in the work AU as the RUs in AU1 which are instructed to store data 23 and 24. Since data has been written in the last RU in work AU1 at this time, as shown in FIG. 14, the memory card 2 performs the closing processing to the work AU. Then, the memory card 2 prepares a new work AU for AU2.

Figure 15:
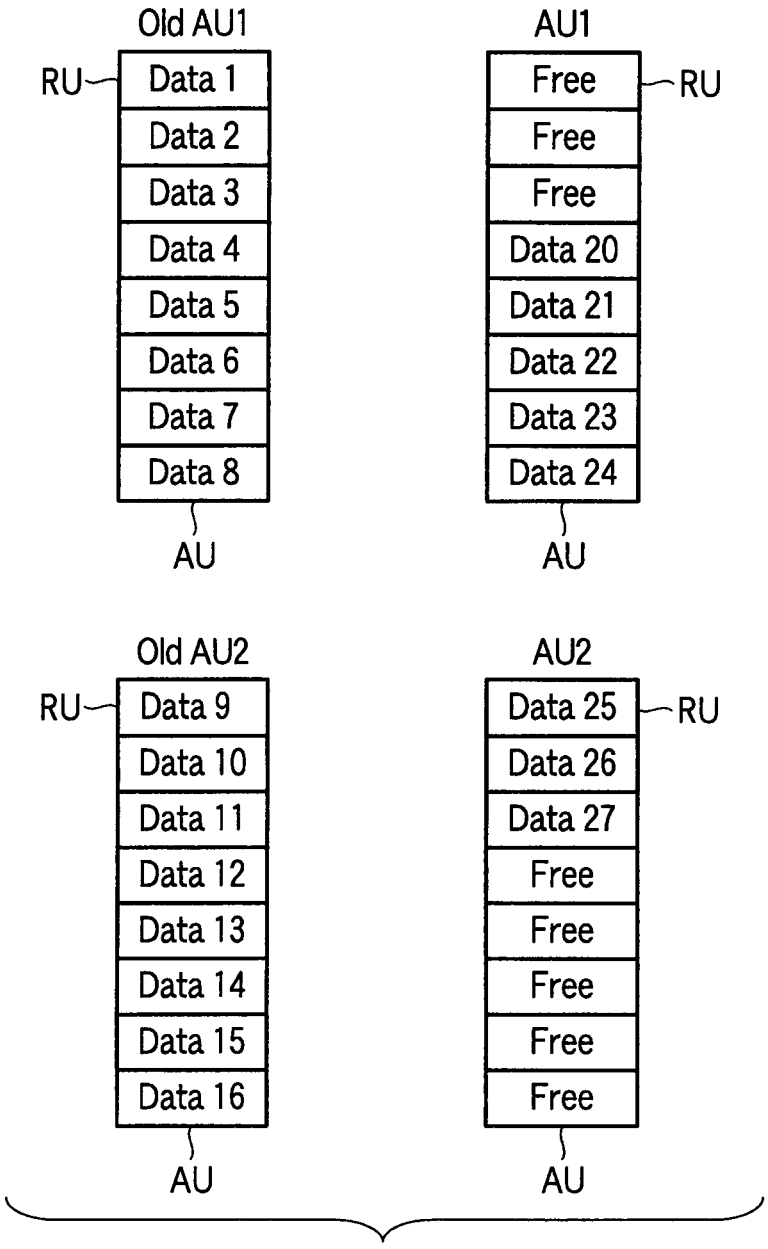
FIG. 15 illustrates a state following FIG. 14.

As shown in FIG. 15, the memory card 2 respectively writes data 25 and 27 in the same first to third RUs in the work AU as the RUs in AU2 which are instructed to store data 25 to 27.

Since the write request has been completed, as shown in FIG. 10, the host 1 supplies the sequential write end command to the memory card 2. Upon receipt of this command, as shown in FIG. 15, the memory card 2 performs the closing processing to the work AU without copying data 12 to 16 stored in the fourth to eighth RUs in AU2 to the work AU, and then shifts to the random write mode. The sequential write end command is not necessary, and the sequential write mode can be terminated when write data with non-sequential logical addresses are detected.

[2-2] Second Example

Figure 16:
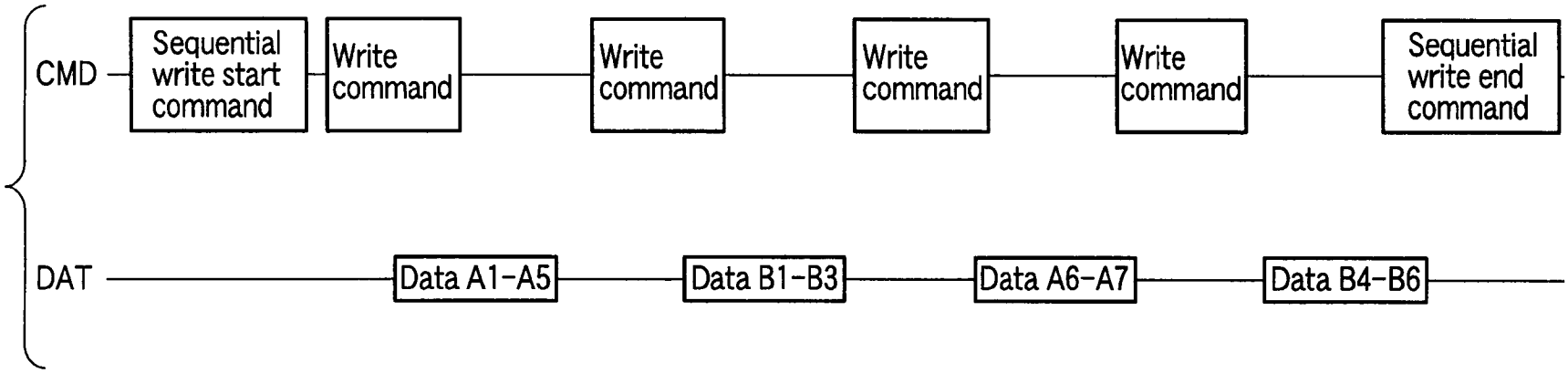
FIG. 16 illustrates a second example of commands and data received by the memory card of the first embodiment.

Parallel recording of data for multiple files using the first example will now be described with reference to FIGS. 16 to 21. FIG. 16 illustrates a second example of the command and data received by the memory card according to the first embodiment. FIGS. 17 to 21 illustrate in order one state during writing of the second example in the memory card 2. AUs except for work AUs in FIGS. 17 to 21 represent AUs recognized by the file system 12, and also represent AUs of the memory card 2 which store the data in AUs recognized by the file system 12. The second example relates to only operation in the sequential write mode, and remaining operation is the same as the first example.

First, the memory card 2 is in the random write mode. As shown in FIG. 16, the memory card 2 will shift to the sequential write mode when it receives the sequential write start command from the host 1.

Figure 17:
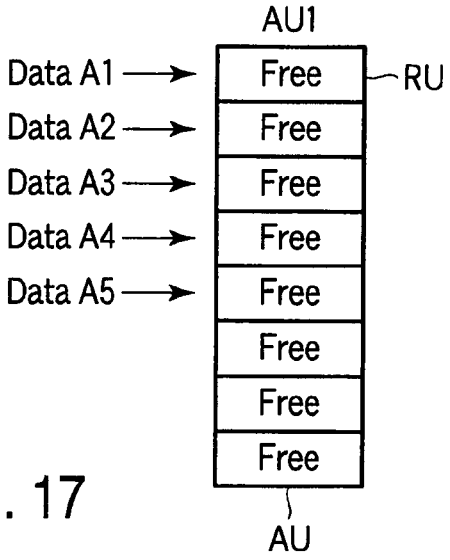
FIG. 17 illustrates a state in the memory card during writing for the second example of the first embodiment.

As shown in FIG. 17, the host 1 wishes to write data A1 to A5 in the first to fifth RUs in AU1. In order to perform this writing, as shown in FIG. 16, the host 1 supplies the write command, and then data A1 to A5 associated with the first to fifth RUs in AU1 to the memory card 2.

The memory card 2 in the sequential write mode, in response to a write request, always prepares a free work AU and writes data in it as described above. Therefore, as shown in an FIG. 18, the memory card 2 respectively writes data A1 and A5 in the same first to fifth RUs in work AU1 as the RUs in AU1 which are instructed to store data A1 to A5.

Figure 18:
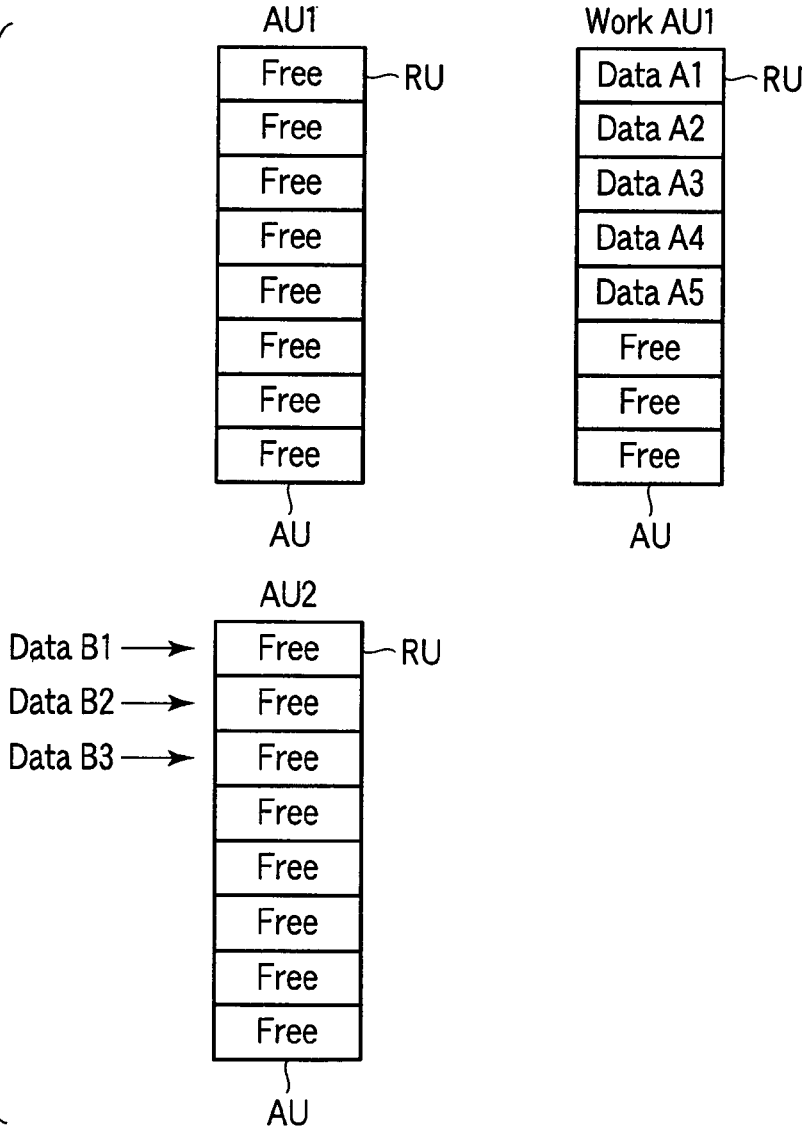
FIG. 18 illustrates a state following FIG. 17.

As shown in FIG. 18, the host 1 wishes to write data B1 to B3 in the first to third RUs in AU2. In order to perform this writing, as shown in FIG. 16, the host 1 supplies the write command, and then data B1 to B3 associated with the first to third RUs in AU2 to the memory card 2. Data B1 to B3 belong to a different AU from data A1 to A3, therefore data B1 to B3 constitute a file different from that constituted by data A1 to A3. As an example, data B1 to B3 is part of video data, and data A1 to A5 are part of other video data. The memory card 2 (controller 22) can determine that data B1 to B3 constitute a different file from that of data A1 to A5 by looking at their AUs, i.e., high bits of their logical addresses.

Upon receipt of the write request of data B1 to B3, the memory card 2 determines that it constitutes a different file from that of data A1 to A5 previously requested to be written from their AUs as described above. As a result of this determination, as shown in FIG. 19, the memory card 2 prepares a new work AU2 for AU2, and respectively writes data B1 to B3 in the same first to third RUs in work AU2 as the RUs in AU2 which are instructed to data B1 to B3.

Figure 19:
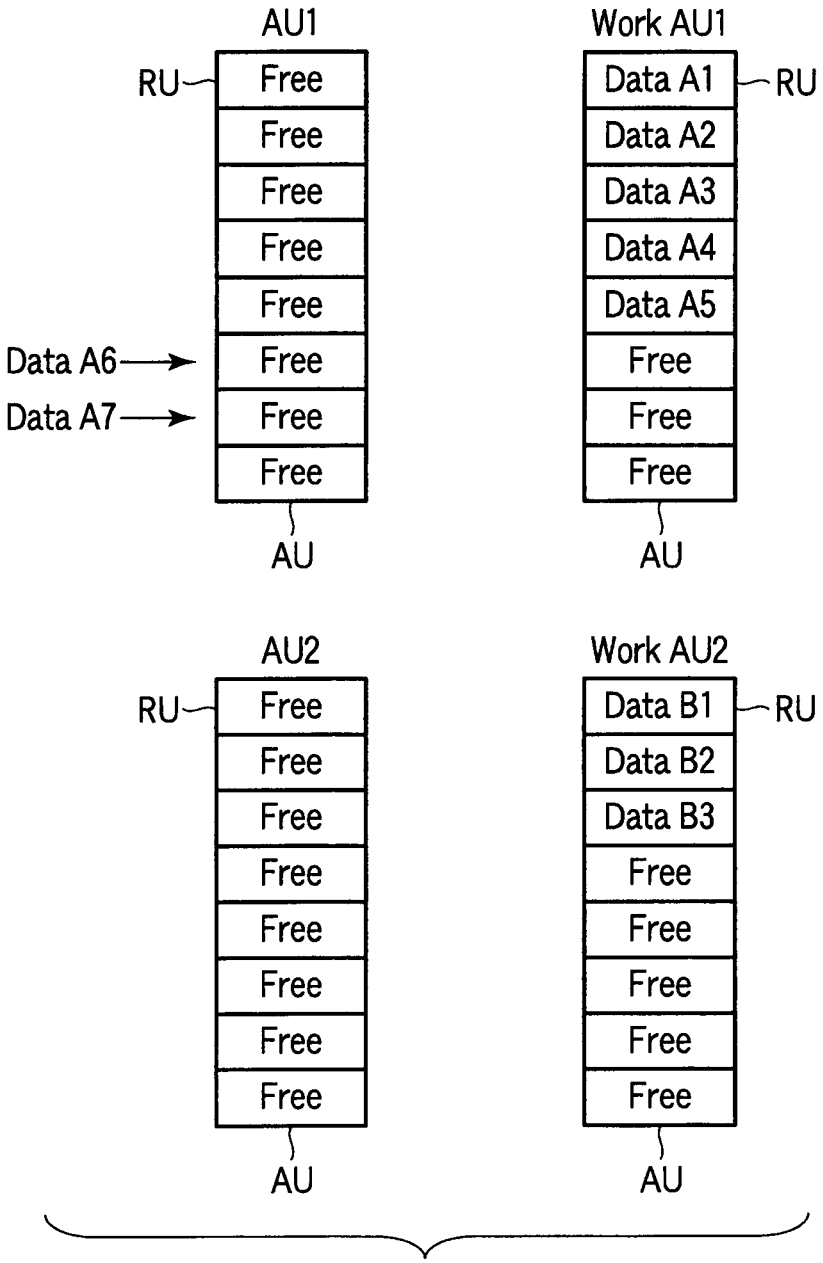
FIG. 19 illustrates a state following FIG. 18.

Further, as shown in FIG. 19, the host 1 wishes to write data A6 and A7 in the sixth and seventh RUs in AU1. In order to perform this writing, as shown in FIG. 16, the host 1 supplies the write command, and then data A6 and A7 associated with the sixth and seventh RUs in AU1 to the memory card 2. Data A6 and A7 belong to AU1 which contain data A1 to A5 previously requested to be written. Therefore, upon receipt of this write request, as shown in an FIG. 20, the memory card 2 respectively writes data A6 and A7 in the same sixth and seventh RUs in work AU1 as the RUs in AU1 which are instructed to store data A6 and A7.

Figure 20:
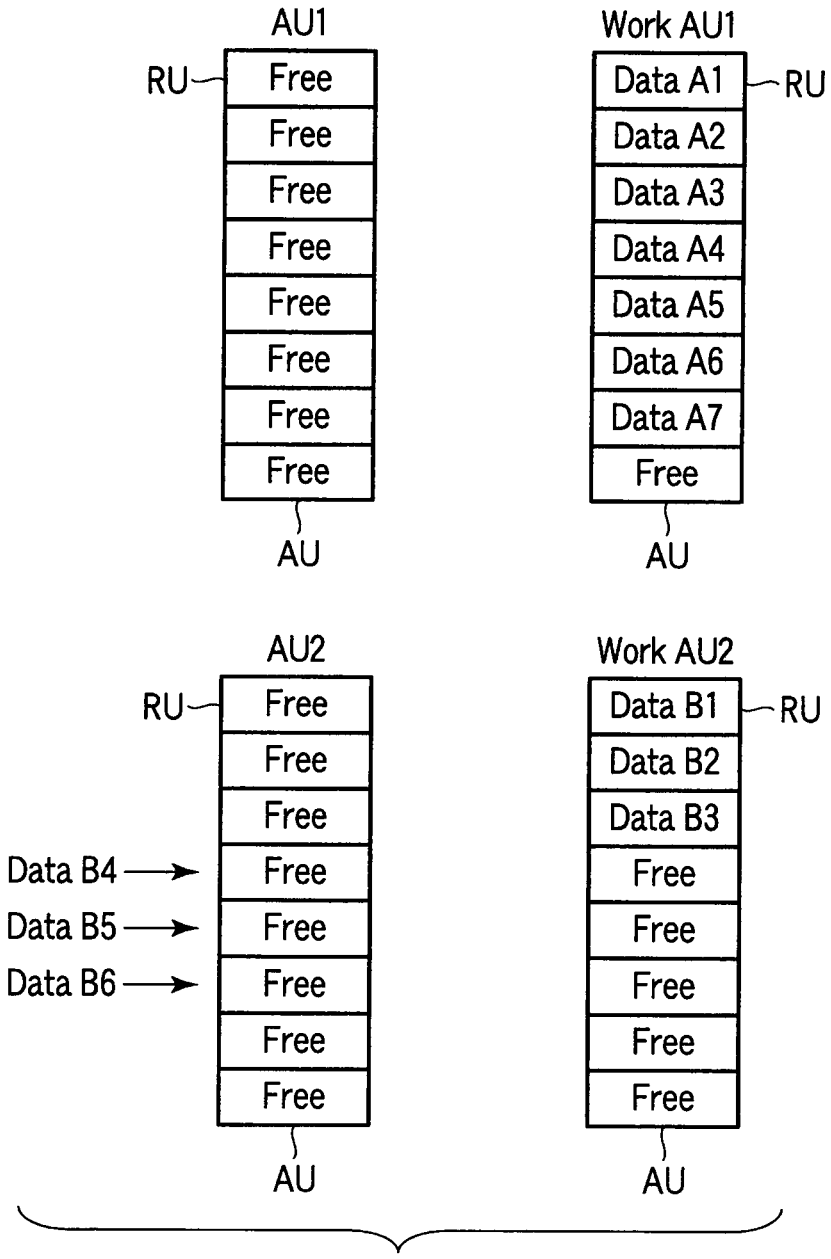
FIG. 20 illustrates a state following FIG. 19.

As shown in FIG. 20, the host 1 wishes to write data B4 to B6 in the fourth to sixth RUs in AU2. In order to perform this writing, as shown in FIG. 16, the host 1 supplies the write command, and then data B4 to B6 associated with the fourth to sixth RUs in AU2 to the memory card 2. Data B4 to B6 belong to AU2 which contain data B1 to B3. Therefore, as shown in FIG. 20, the memory card 2 respectively writes data B4 to B6 in the same fourth to sixth RUs in work AU2 as the RUs in AU2 which are instructed to store data B4 to B6.

Figure 21:
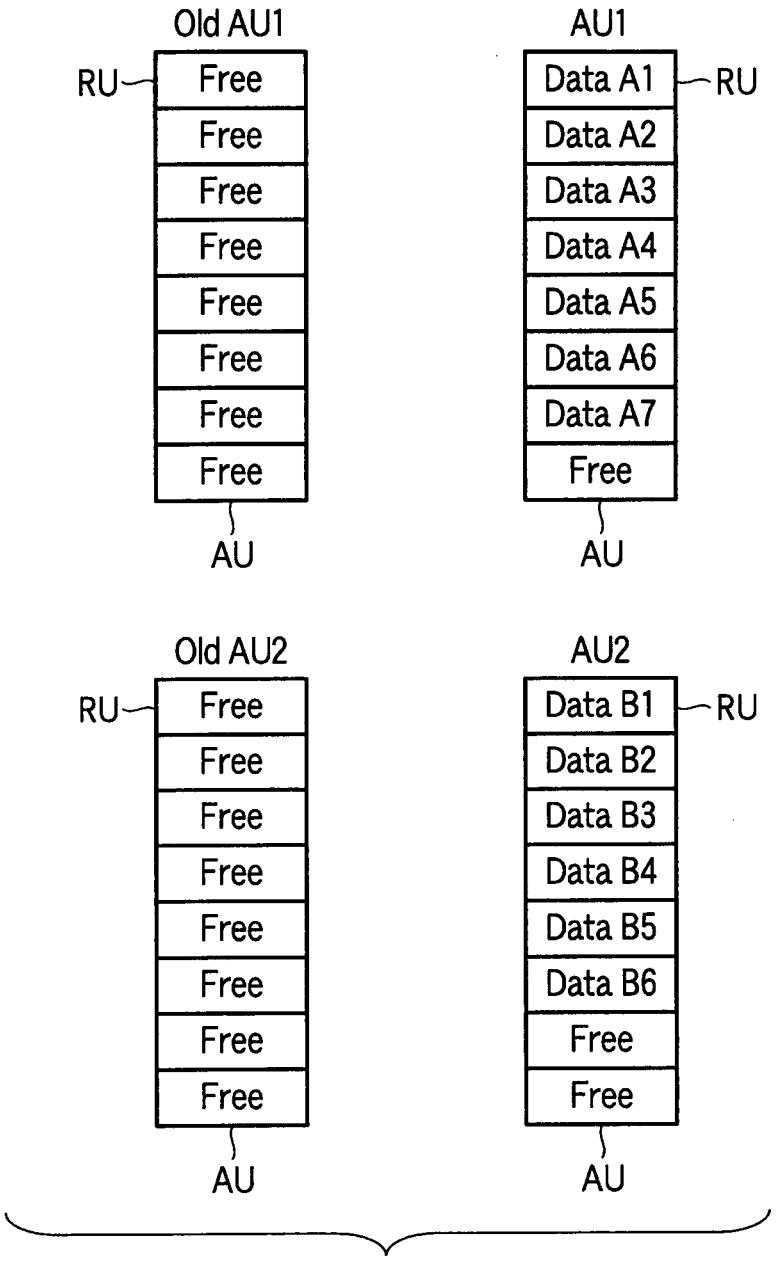
FIG. 21 illustrates a state following FIG. 20.

Since the write request has been completed, as shown in FIG. 16, the host 1 supplies the sequential write end command to the memory card 2. Upon receipt of this command, as shown in FIG. 21, the memory card 2 performs the closing processing to all the works AU, and then shifts to the random write mode.

Note that, the second example illustrates data group for two files, i.e., two streams which comprise a file by data A1 to A7, and another file by data B1 to B6. The present embodiment, however, can also be applied to three or more streams in accordance with the principle described in the specification. How many streams of data can simultaneously be written by the memory card 2 depends on how many work AUs can be prepared by the memory card 2. The number of the works AU simultaneously prepared can be determined according to the write speed and/or storage capacity of the memory card 2, or specification.

[2-3] Third Example

Figure 22:
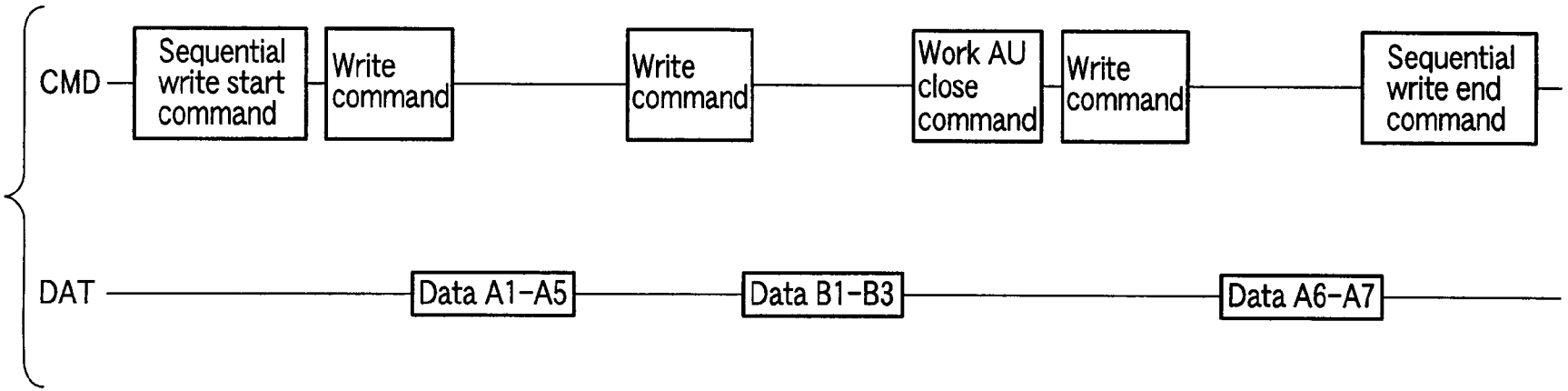
FIG. 22 illustrates a third example of commands and data received by the memory card of the first embodiment.

The technique for closing the work AU at required timing will now be described with reference to FIGS. 22 to 27. FIG. 22 illustrates a third example of commands and data received by the memory card of the first embodiment. FIGS. 23 to 27 illustrate in order one state during writing of the third example in the memory card 2. AUs except for work AUs in FIGS. 23 to 27 represent AUs recognized by the file system 12, and also represent AUs of the memory card 2 which store the data in AUs recognized by the file system 12. The third example relates to only operation in the sequential write mode, and remaining operation is the same as the first example.

First, the memory card 2 is in the random write mode. In this state, as shown in FIG. 22, the memory card 2 shifts to the sequential write mode when it receives the sequential write start command from the host 1.

Figure 23:
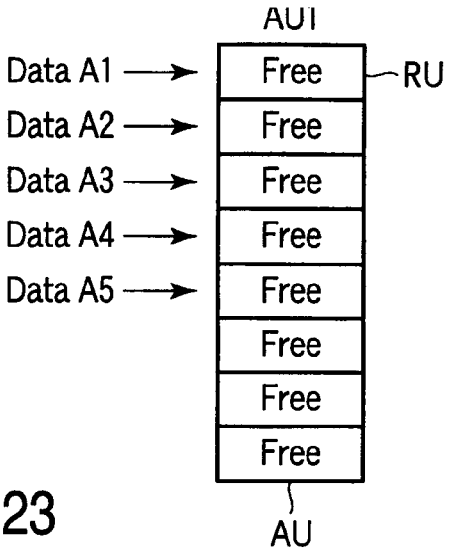
FIG. 23 illustrates a state in the memory card during writing for the third example of the first embodiment.

As shown in FIG. 23, the host 1 wishes to write data A1 to A5 in the first to fifth RUs in AU1. In order to perform this writing, as shown in FIG. 22, the host 1 supplies the write command, and then data A1 to A5 associated with the first to fifth RUs in AU1 to the memory card 2.

Figure 24:
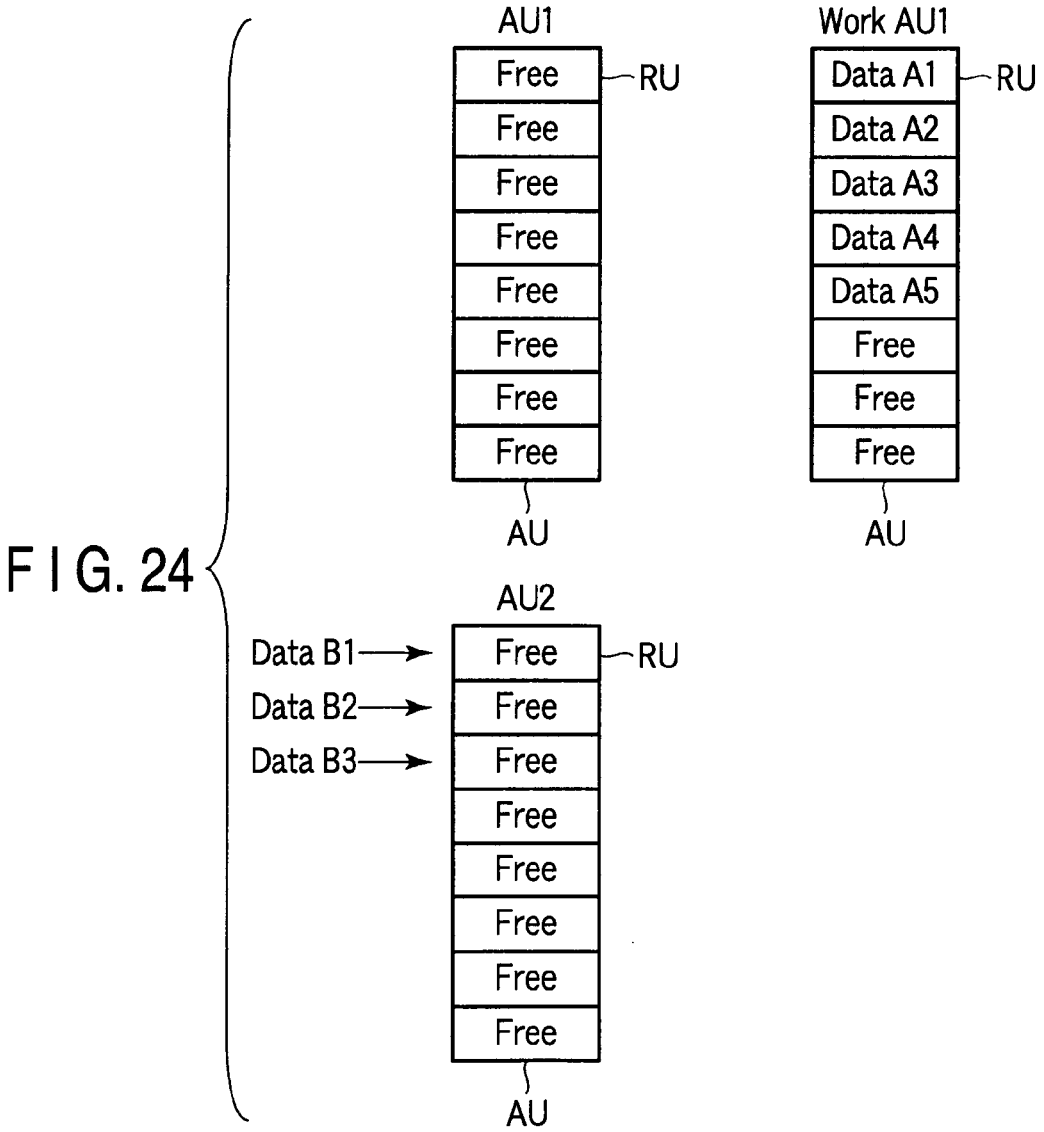
FIG. 24 illustrates a state following FIG. 23.

Upon receipt of this write request, as shown in FIG. 24, the memory card 2 prepares a new work AU1 for AU1, and respectively writes data A1 to A5 in the same first to fifth RUs in work AU1 as the RUs in AU1 which are instructed to store data A1 to A5.

Figure 25:
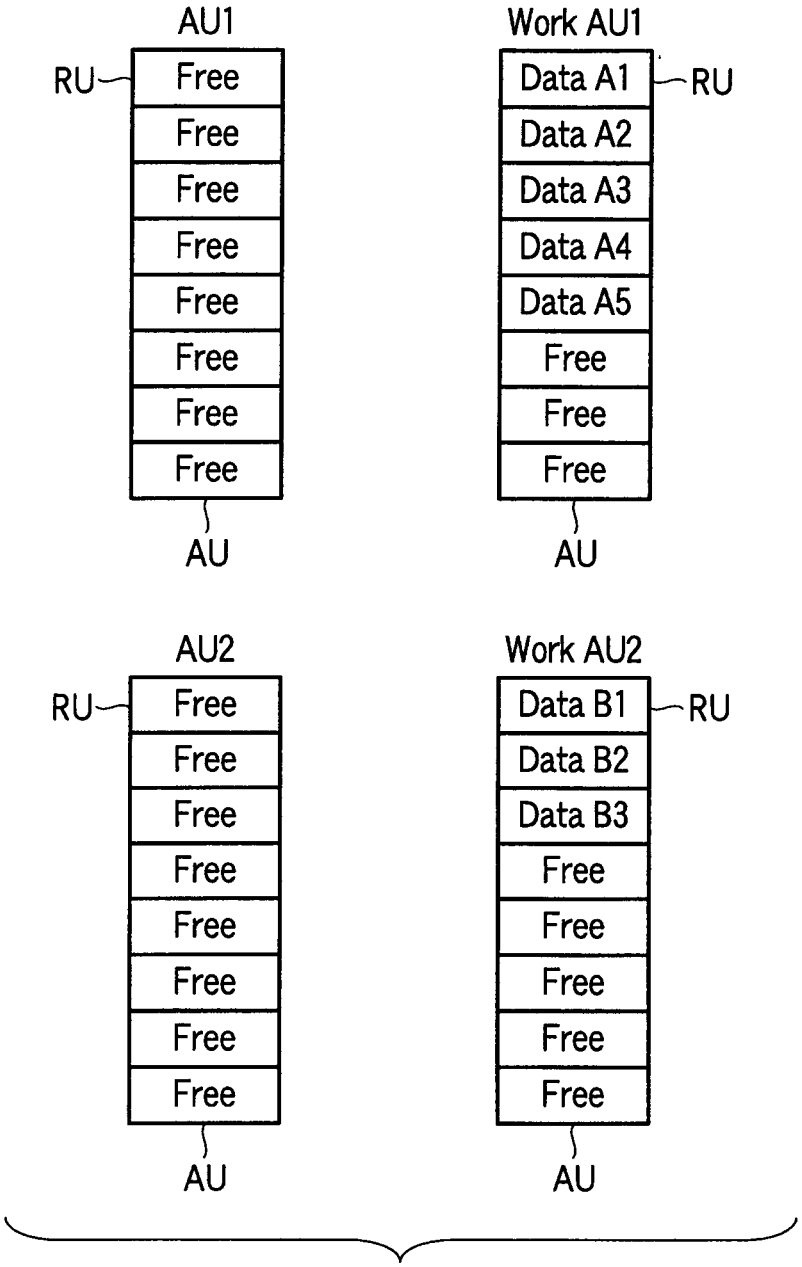
FIG. 25 illustrates a state following FIG. 24.

As shown in FIG. 24, the host 1 wishes to write data B1 to B3 in the first to third RUs in AU2. In order to perform this writing, as shown in FIG. 22, the host 1 supplies the write command, and then data B1 to B3 associated with the first to third RUs in AU2 to the memory card 2. As shown in FIG. 25, since data B1 to B3 constitute a different file from that constituted by data A1 to A5, the memory card 2 prepares a new work AU2 for AU2. The memory card 2 respectively writes data B1 to B3 in the same first to third RUs in work AU2 as the RUs in AU2 which are instructed to store data B1 to B3.

Then, in order to complete the writing of the file constituted by data B1 to B3 while continuing the writing of the file partly constituted by data A1 to A5, the host 1 supplies a work AU close command to the memory 2. Upon receipt of this command, the memory card 2 performs a closing processing to the work AU into which data has been written just before this command. As a result, the further work AU can be provided instead of work AU2. For example, if the memory card 2 can write two files in parallel, it will be ready to write file data after the closing processing to work AU2. The close command can also be realized by specifying an argument which requires the closing processing in the sequential write end command.

The close command has an argument which specifies the target work AU for the closing processing. This argument can specify the last work AU into which data has been written as described above, any work AU among multiple work AUs, or all the work AUs.

Figure 26:
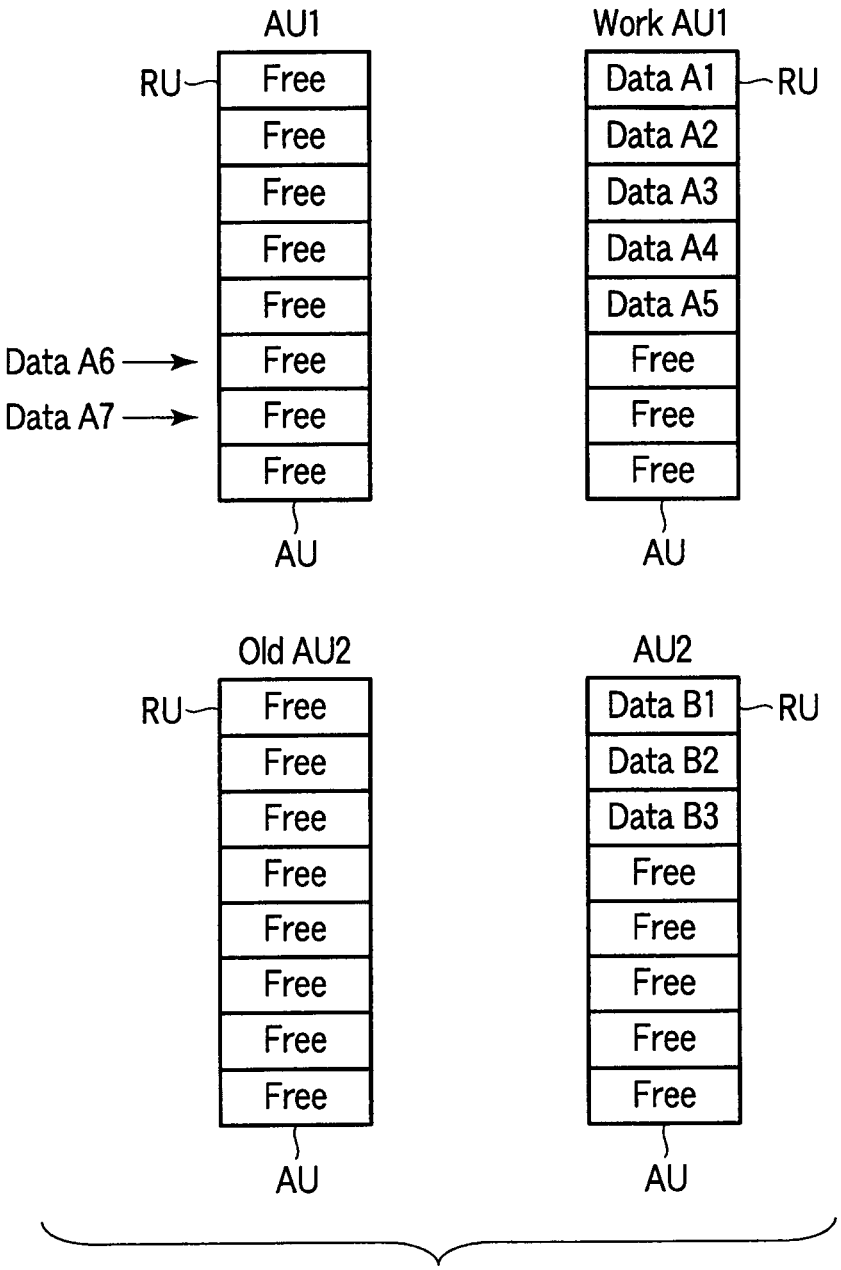
FIG. 26 illustrates a state following FIG. 25.
Figure 27:
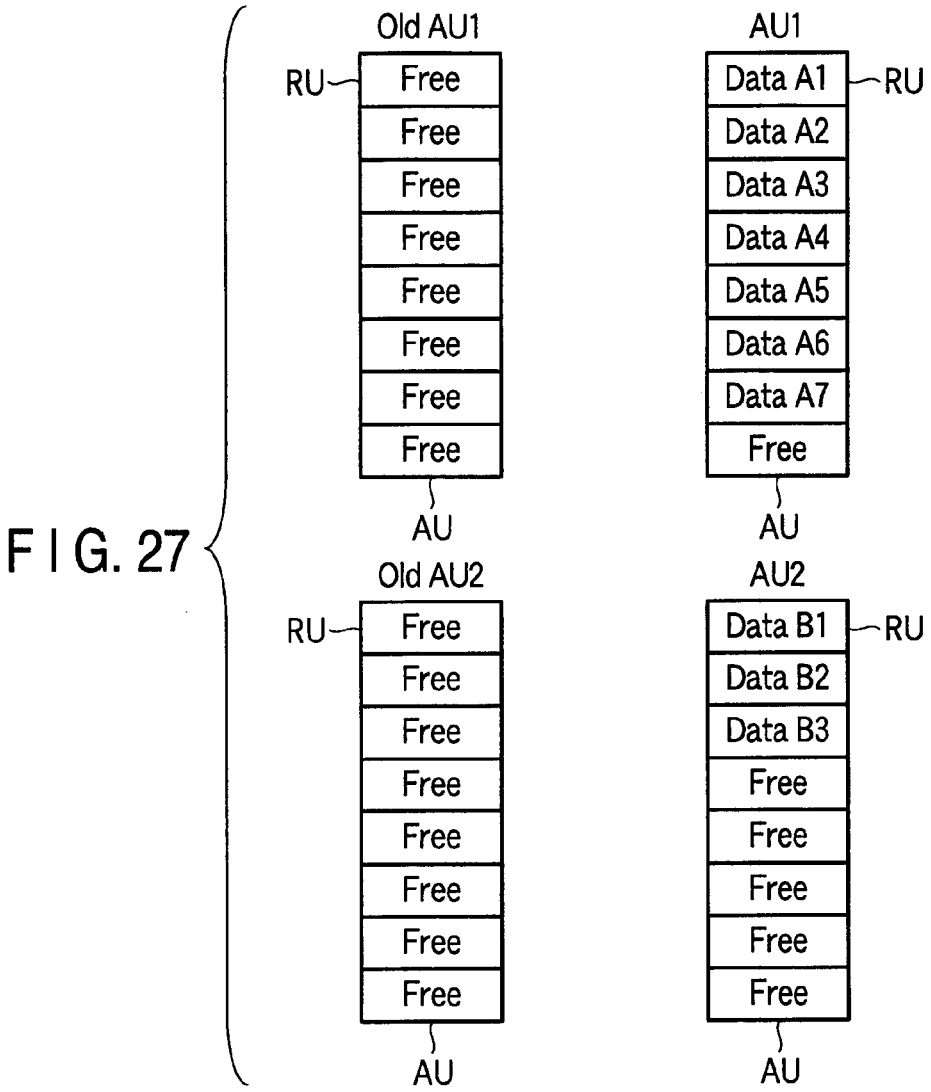
FIG. 27 illustrates a state following FIG. 26.

As shown in FIG. 26, the host 1 wishes to write data 6 and 7 in the sixth and seventh RUs in AU1. In order to perform this writing, as shown in FIG. 22, the host 1 supplies the write command, and then data A6 and A7 associated with the sixth and seventh RUs in AU1 to the memory card 2. Upon receipt of this write request, as shown in an FIG. 27, the memory card 2 respectively writes data A6 and A7 in the same sixth and seventh RUs in work AU1 as the RUs in AU1 which are instructed to store data A6 and A7.

Since the write request has been completed, as shown in FIG. 22, the host 1 supplies the sequential write end command to the memory card 2. Upon receipt of this command, as shown in FIG. 21, the memory card 2 performs the closing processing to all the work AUs (only work AU1, in the present example), and then shifts to the random write mode.

As described above, the memory card according to the first embodiment has the random write mode and sequential write mode. In the sequential write mode, in response to update request of data, the data in the RUs belonging to the AU which contains the RUs not to be updated is not copied to the new AU. Therefore, in the sequential write mode, data is always written in continuous free RUs. The speed of such writing is the maximum one realizable by the flash memory 21. To be allowed to write data with the maximum performance is very beneficial to the host 1. The maximum write speed depends on the inherent performance of the flash memory 21 and is almost constant. For this reason, the time required to complete the instructed writing can be easily calculated from the maximum write speed and the number of AUs (RUs) derived from the data size required to be written by the host 1. Such calculation is easy, which requires short time.

Moreover, in the memory card 2, data is written in continuous RU pages in order of the logical address of the write data. Such data writing can draw the maximum write speed out of the memory 21. Furthermore, the memory card does not copy data in the sequential write mode, it can keep writing in response to a write request. As described above, since the speed by such writing is the maximum for the memory 21, the memory card 2 can keep writing by the maximum write speed in the sequential write mode.

Since the memory card 2 can maintain the maximum write speed in the sequential write mode, providing an exclusive work AU to data for each of two or more separate files allows for saving data for two or more files in parallel as described in relation with the second example.

Moreover, according to the memory card according to the first embodiment, a work AU close command is provided. With this command, the memory card 2 which is writing data for multiple files in parallel can perform the closing processing to selected work AUs, without waiting for supply of the sequential write end command. As a result, it can release the work AU for write-completed file data to provide anew work AU for other file data. This is useful when this function is realized with hardware because how many streams can be written in parallel is limited.

Second Embodiment

In a second embodiment, the exclusive command for transition to a specific writing ready state is provided. The memory card according to the second embodiment has the same configuration as and operates differently from the first embodiment (FIGS. 1 to 5).

[1] First Example

Figure 28:
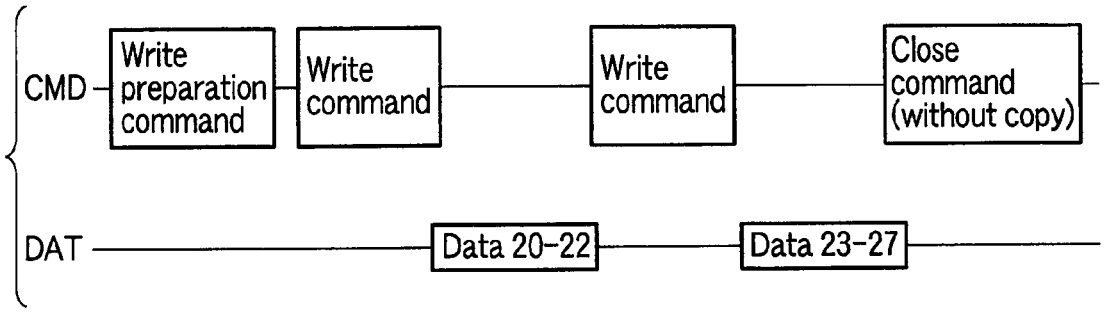
FIG. 28 illustrates a first example of commands and data received by the memory card of a second embodiment.

Operation of the first example of the second embodiment will be described with reference to FIGS. 28 to 34. FIG. 28 illustrates the first example of commands and data received by the memory card according to the second embodiment. FIGS. 29 to 33 illustrate in order one state during writing of the first example in the memory card 2. AUs except for work AUs in FIGS. 29 to 33 represent AUs recognized by the file system 12, and also represent AUs of the memory card 2 which store the data in AUs recognized by the file system 12.

Figure 29:
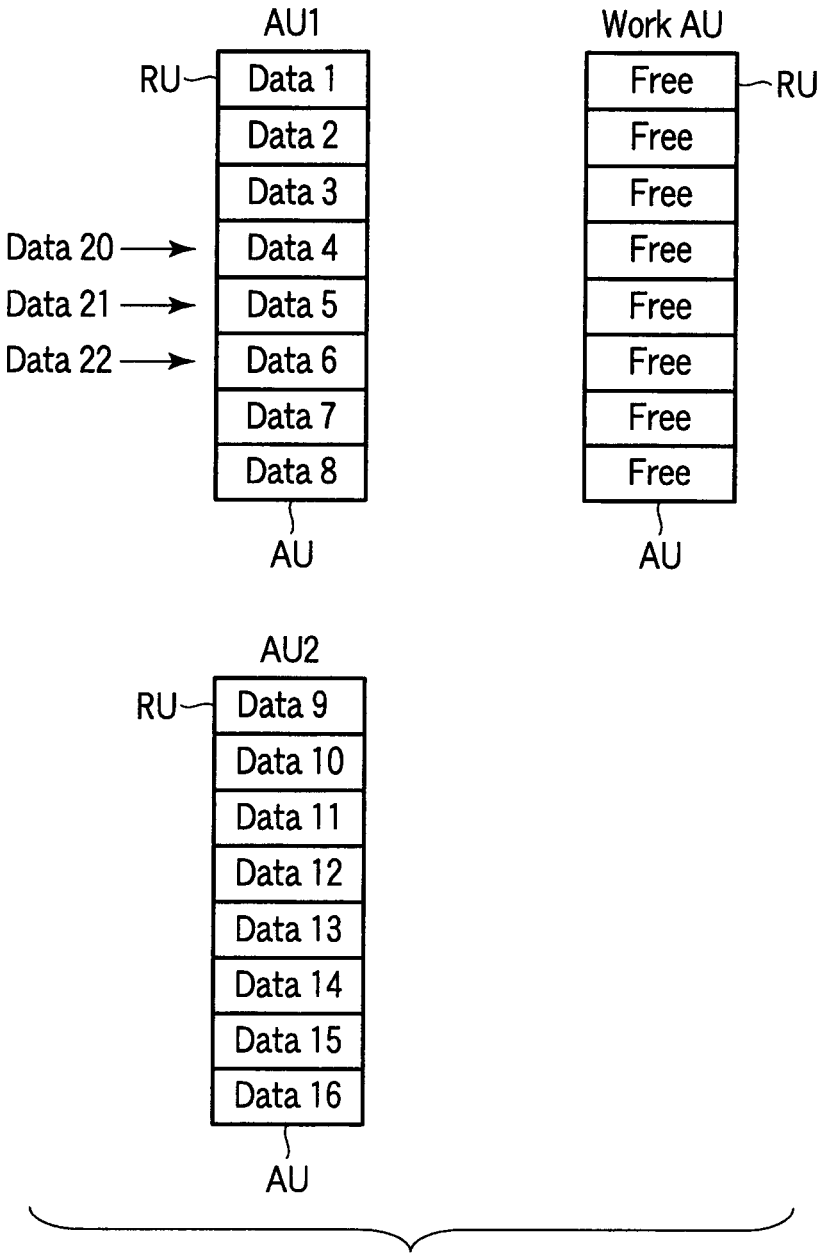
FIG. 29 illustrates a state in the memory card during writing for the first example of the second embodiment.

First, as shown in FIG. 29, the first to eighth RUs in AU1 store data 1 to 8, and the first to eighth RUs in AU2 store data 9 to 16. Then, as shown in FIG. 28, the host 1 supplies a write preparation command to the memory card 2. Upon receipt of this command, the memory card 2 carries out preparation for shifting to a state where writing can start immediately. The memory card 2 informs the host 1 of its under preparation while performing the transition processing to a real-time write ready (immediate write) state mode (real-time write enable mode) by transmitting a signal, for example, indicative of a busy state. After the busy state finishes, the host 1 starts writing.

As shown in FIG. 29, the host 1 wishes to write data 20 to 22 in the fourth to sixth RUs in AU1. In order to perform this writing, as shown in FIG. 28, the host 1 supplies the write command, and then data 20 to 22 associated with the fourth to sixth RUs in AU1 to the memory card 2.

Upon receipt of a write request, the memory card 2 in the real-time write enable state prepares the work AU for the AU of write target (AU1) unless it has previously received a continuation command (to be described later) as shown in FIG. 29.

Figure 30:
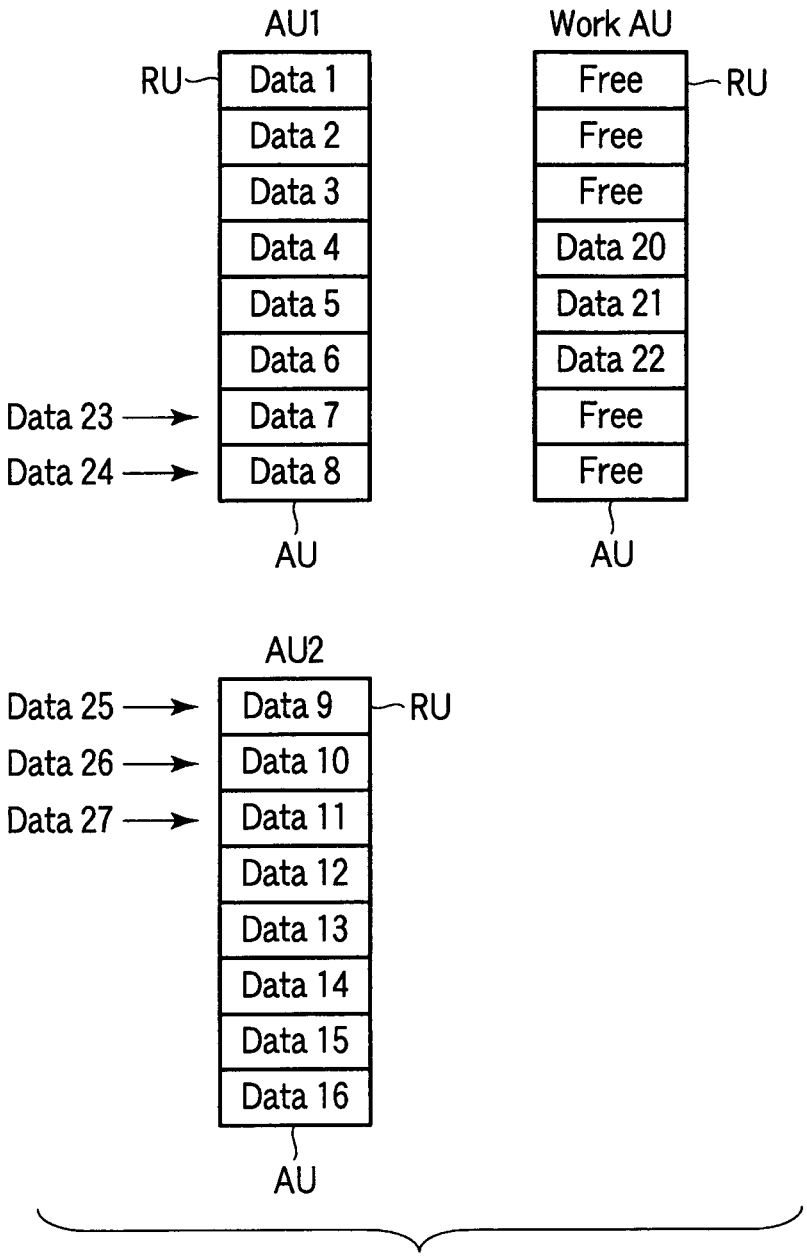
FIG. 30 illustrates a state following FIG. 29.
Figure 31:
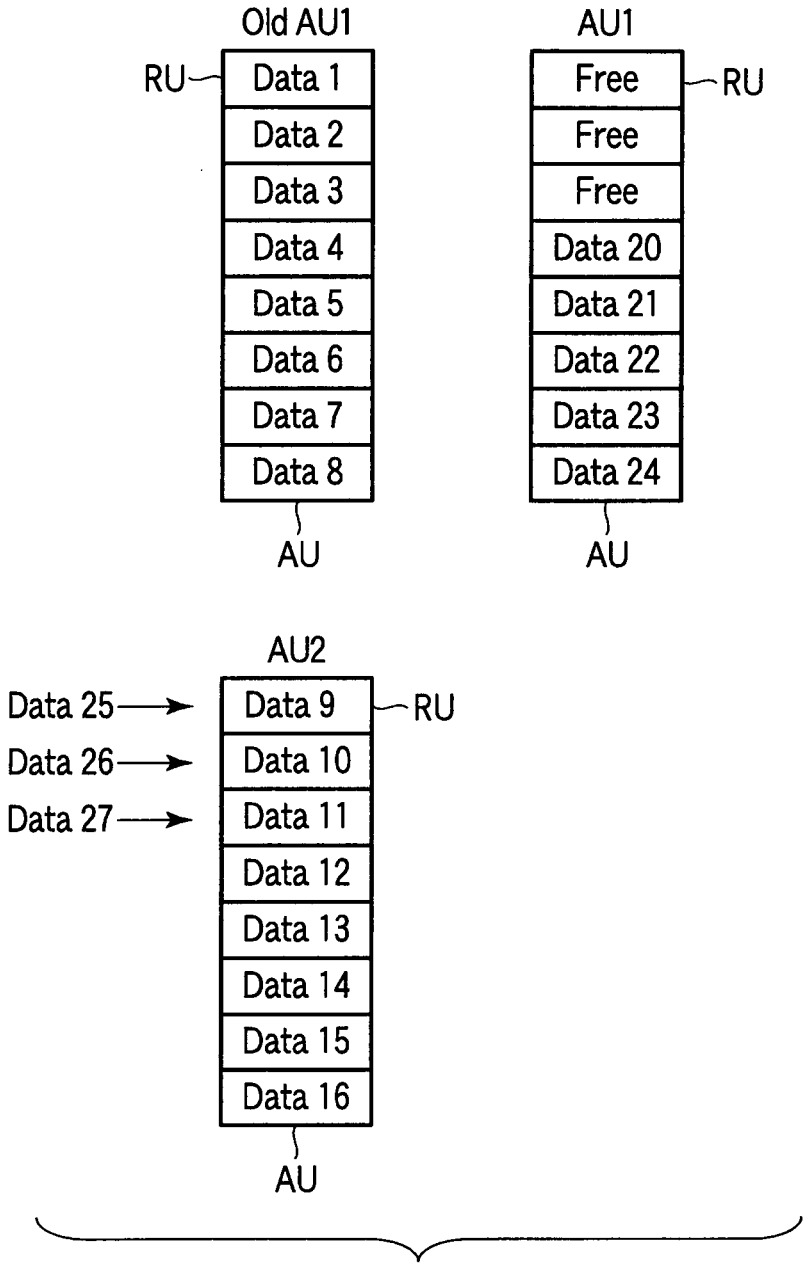
FIG. 31 illustrates a state following FIG. 30.
Figure 32:
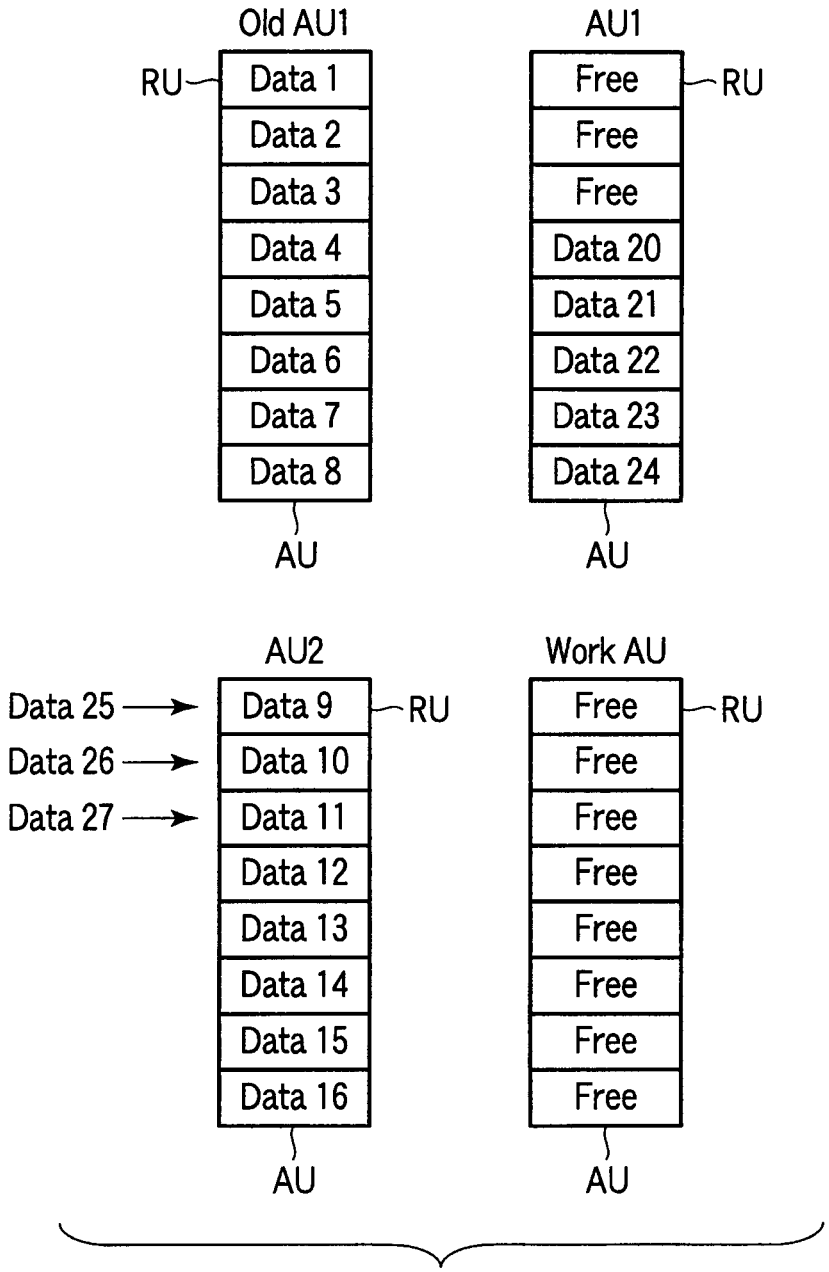
FIG. 32 illustrates a state following FIG. 31.

This write request requests the writing from a non-leading RU in the AU. The memory card 2 in the immediate write state does not copy data in lower RUs (first to third RUs) than the write-data RUs in the AU (AU1) to which the write data belong to (fourth to sixth RUs in this example) to the work AU. Therefore, as shown in FIG. 30, the memory card 2 respectively writes data 20 to 22 in the same fourth to sixth RUs in the work AU as the RUs in AU1 which are instructed to store data 20 to 22.

The host 1 wishes to update data 7 and 8 of the seventh and eighth RUs in AU1 by data 23 and 24, and update data 9 to 11 of the first to third RUs in AU2 by data 25 to 27. In order to perform this update, as in an FIG. 28, the host 1 supplies the write command, data 23 and 24 associated with the seventh and eighth RUs in AU1, and data 25 to 27 associated with the first to third RUs in AU2 to the memory card 2. Upon receipt of this write request, as shown in an FIG. 32, the memory card 2 respectively writes data 23 and 24 in the same seventh and eighth RUs in the work AU as the RUs in AU1 which are instructed to store data 23 and 24. At this time, since data has been written in the last RU in the work AU, the memory card 2 performs the closing processing to the work AU. The memory card 2 then prepares a new work AU for AU2.

Figure 33:
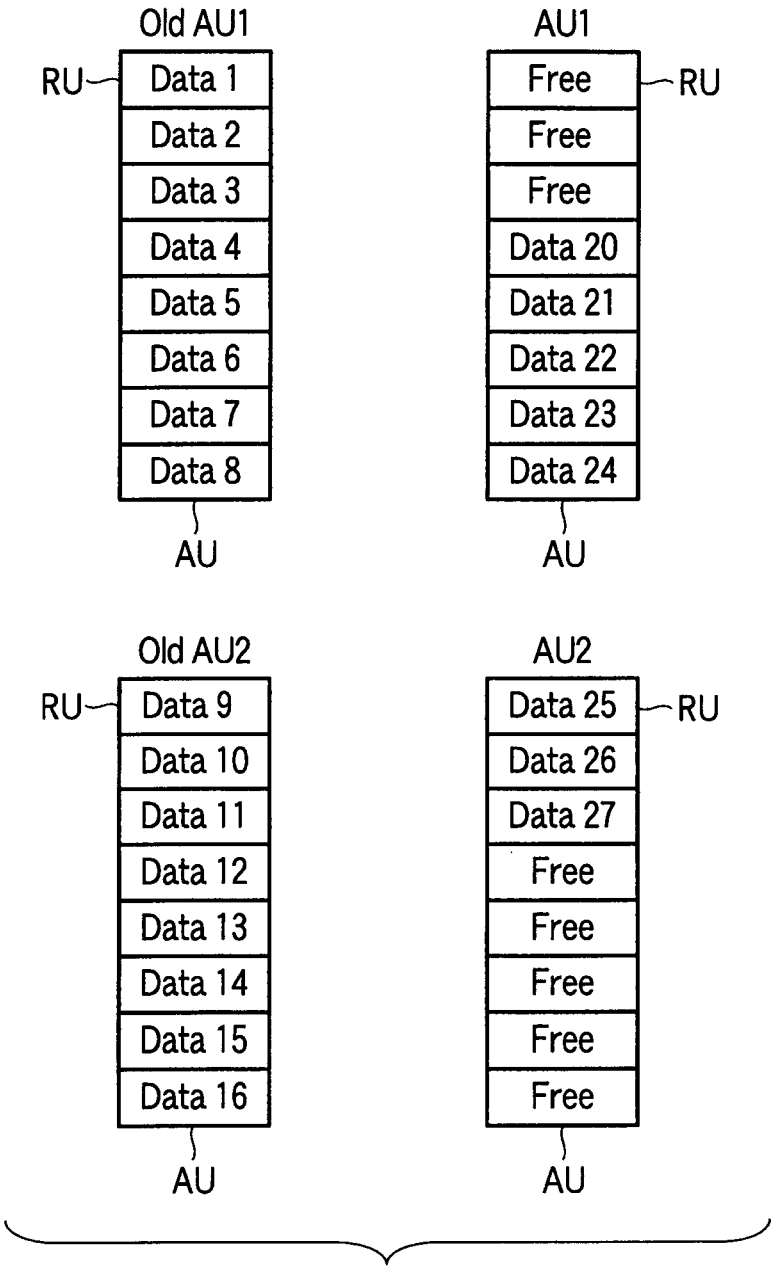
FIG. 33 illustrates a state following FIG. 32.

As shown in an FIG. 33, the memory card 2 respectively writes data 25 and 27 in the same first to third RUs in the work AU as the RUs in AU2 which are instructed to store data 25 to 27.

Since the write request has been completed, as shown in FIG. 28, the host 1 supplies the close command to the memory card 2. The close command has the argument which specifies the target work AU for the closing processing as in the first embodiment, and has an argument which specifies with a copy or without a copy. In the close command supplied by FIG. 28, without a copy is specified. Upon receipt of this command, as shown in FIG. 33, the memory card 2 performs the closing processing to the work AU without copying data 12 to 16 of non-updated RUs (third to eighth RUs) in the AU (AU2) targeted for the writing by the last write command to the work AU.

In the second embodiment, operations other than those in the real-time write enable state remain the same as those in the random write mode of the first embodiment.

[2] Second Example

Figure 34:
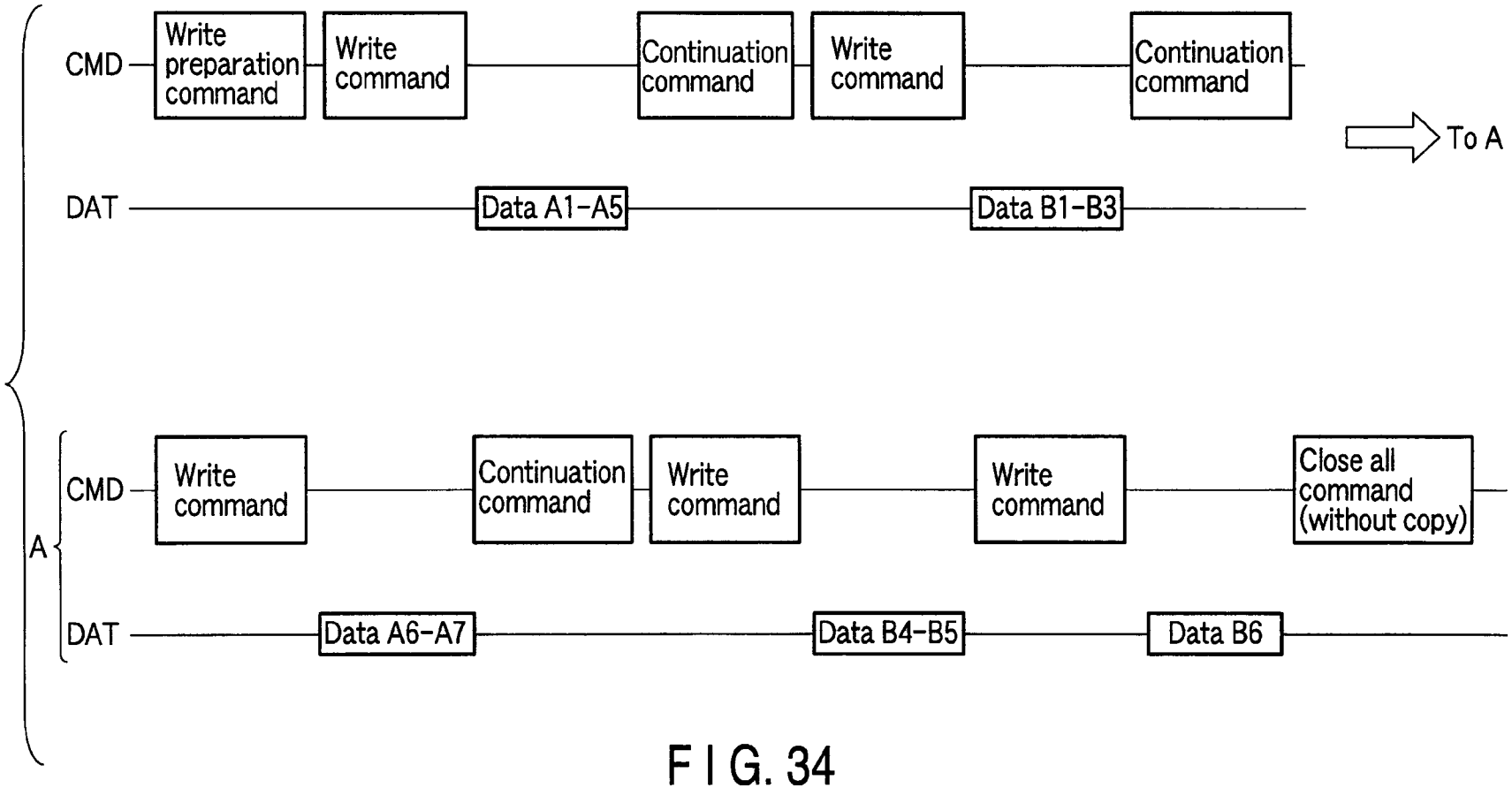
FIG. 34 illustrates a second example of commands and data received by the memory card of the second embodiment.

Parallel recording of data for multiple files using the first example will now be described with reference to FIGS. 34 to 39. FIG. 34 illustrates the second example of commands and data received by the memory card according to the second embodiment. FIGS. 35 to 39 illustrate in order one state during writing of the second example in the memory card 2. AUs except for work AUs in FIGS. 35 to 39 represent AUs recognized by the file system 12, and also represent AUs of the memory card 2 which store the data in AUs recognized by the file system 12.

As shown in FIG. 34, the memory card 2 shifts to the real-time write enable state with the write preparation command received from the host 1.

Figure 35:
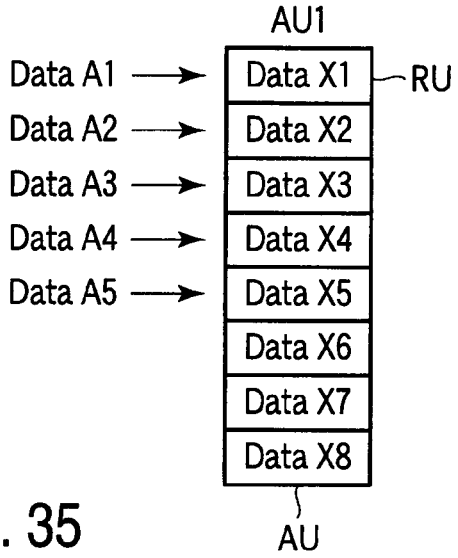
FIG. 35 illustrates a state in the memory card during writing for the second example of the second embodiment.

As shown in FIG. 35, the host 1 wishes to write data A1 to A5 in the first to fifth RUs in AU1. In order to perform this writing, as shown in FIG. 34, the host 1 supplies the write command, and then data A1 to A5 associated with the first to fifth RUs in AU1 to the memory card 2. The first to eighth RUs in AU1 store data X1 to X8.

Figure 36:
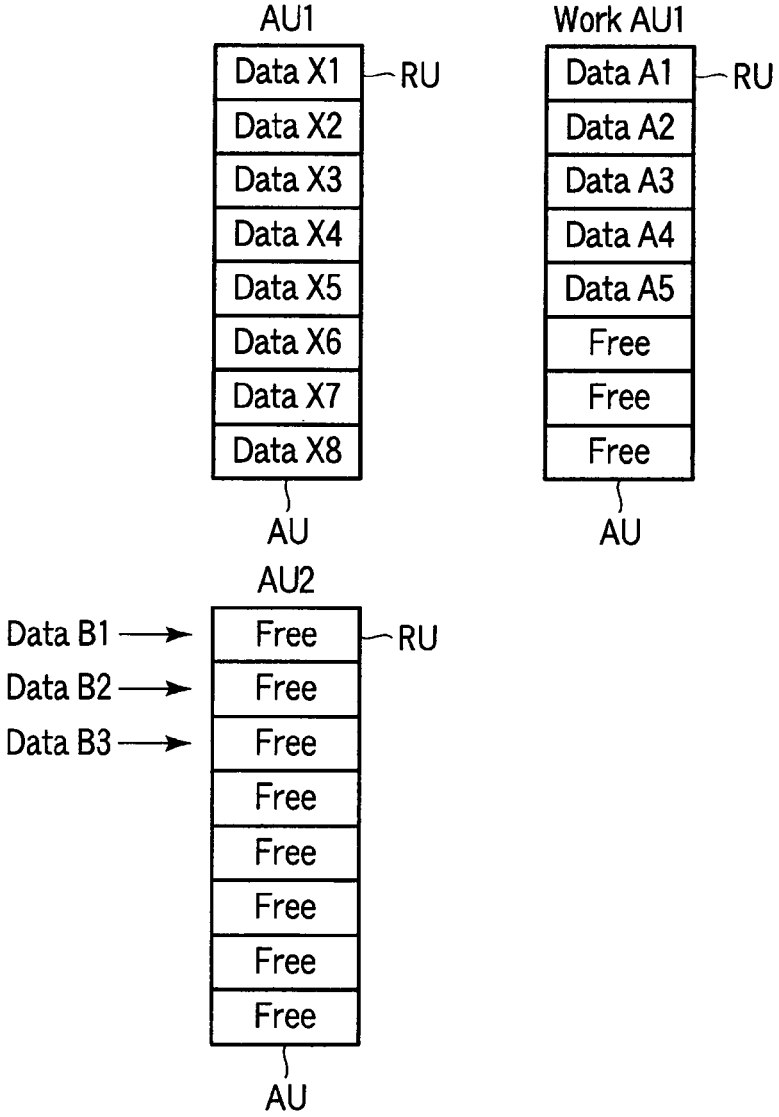
FIG. 36 illustrates a state following FIG. 35.

As described above, the memory card 2 in the real-time write enable state prepares a new work AU unless it has previously received the continuation command (to be described later). For this reason, as shown in FIG. 36, the memory card 2 prepares work AU1 for AU1. The memory card 2 then respectively writes data A1 and A5 in the same first to third RUs in work AU1 as the RUs in AU1 which are instructed to store data A1 to A5.

The host 1 wishes to write data for a different file from the file partly constituted by data A1 to A5 in parallel. For this reason, it expects to write data in work AU1 later. For this reason, as shown in FIG. 34, the host 1 supplies the continuation command to the memory card 2. The continuation command can be realized by providing an argument which specifies instruction for the closing processing or instruction for maintaining of the work AU in the close command. Alternatively, a command other than the close command may be provided. Upon receipt of the continuation command, as shown in FIG. 36, the memory card 2 maintains work AU1 for AU1 which is the write target by the write request just before the continuation command, without performing the closing processing to work AU1.

As shown in FIG. 36, the host 1 wishes to write data B1 to B3 in the first to third RUs in AU1. In order to perform this writing, as shown in FIG. 34, the host 1 supplies the write command, and then data B1 to B3 associated with the first to third RUs in AU2 to the memory card 2.

Figure 37:
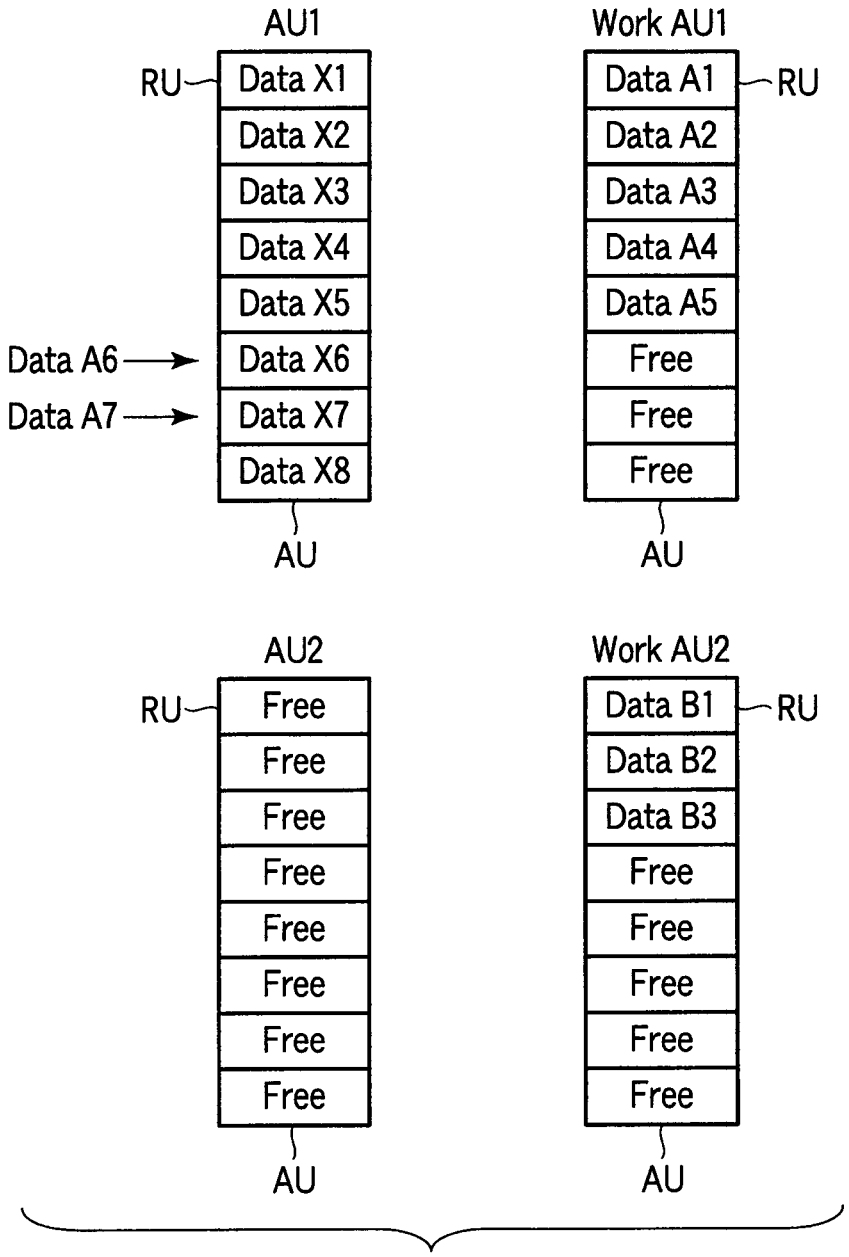
FIG. 37 illustrates a state following FIG. 36.

As described above, upon receipt of the write command, the memory card 2 in the real-time write enable state creates a new work AU unless continuous use of the existing work AU is required by the continuation command. Since data B1 to B3 belong to the AU (AU2) different from AU to which data A1 to A3 belong (AU1), as shown in FIG. 37, the memory card 2 prepares work AU2 upon receipt of the write data B1 to B3. The memory card 2 respectively writes data B1 to B3 in the same first to third RUs in work AU2 as the RUs in AU2 which are instructed to store data B1 to B3.

Then, in order to write the data following data A5, as shown in FIG. 34, the host 1 supplies the continuation command to the memory card 2. Upon receipt of the continuation command, as shown in FIG. 37, the memory card 2 will maintain work AU2 for the AU which is the target by the write request just before this command.

As shown in FIG. 37, the host 1 wishes to write data A6 to A7 in the sixth and seventh RUs in AU1. In order to perform this writing, as shown in FIG. 34, the host 1 supplies the write command, and then data A6 to A7 associated with the sixth and seventh RUs in AU1 to the memory card 2.

Figure 38:
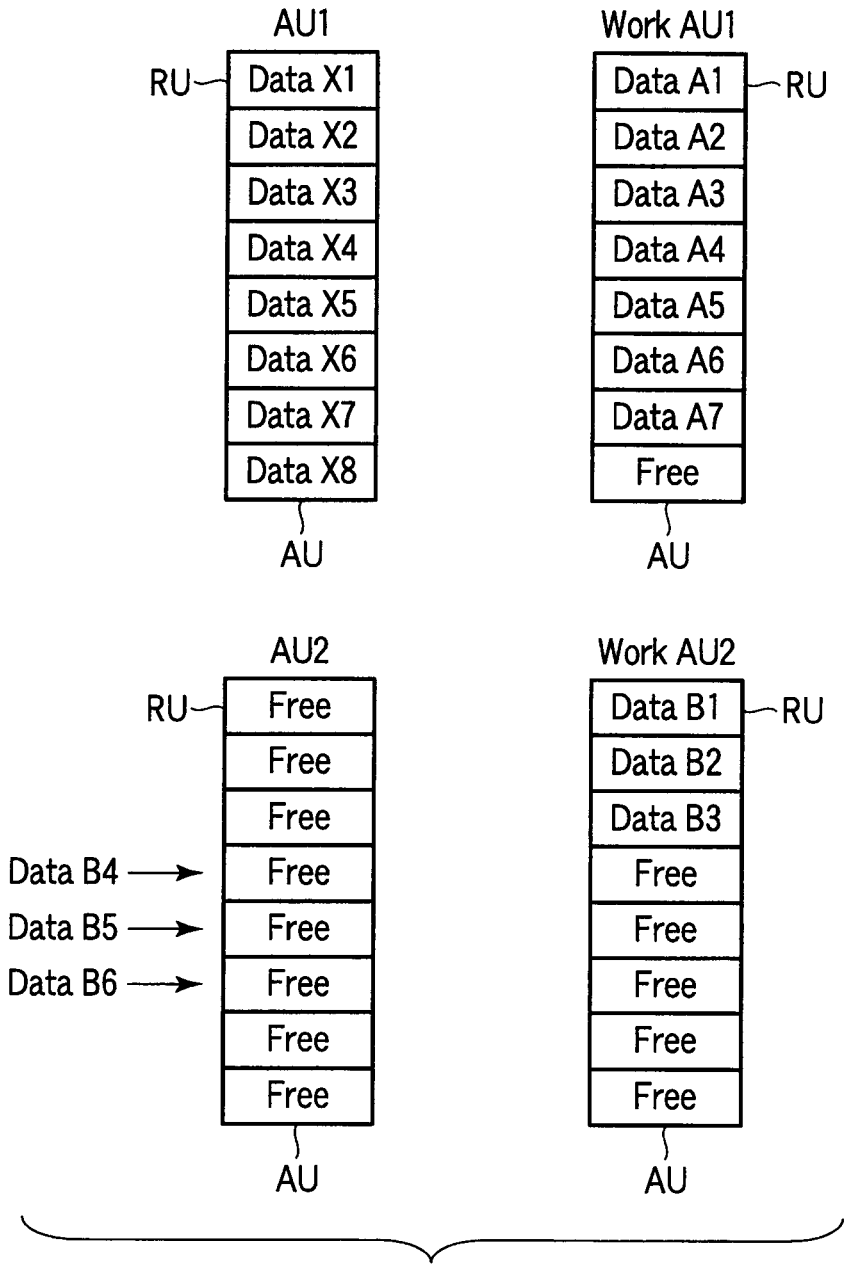
FIG. 38 illustrates a state following FIG. 37.

Since the memory card 2 maintains work AU1 for AU1 as shown in FIG. 38, the memory card 2 does not create a new work AU in response to the write command. Rather, the memory card 2 respectively writes data A6 and A7 in the same sixth and seventh RUs in work AU1 as the RUs in AU1 which are instructed to store data A6 and A7.

Then, in order to write the data following data B3, as shown in FIG. 34, the host 1 supplies the continuation command to the memory card 2. Upon receipt of the continuation command, as shown in FIG. 38, the memory card 2 maintains work AU1 for the AU which is the target by the write request just before this command.

As shown in FIG. 38, the host 1 wishes to write data B4 and B5 in the fourth and fifth RUs in AU2. In order to perform this writing, as shown in FIG. 34, the host 1 supplies the write command, and then data B4 and B5 associated with the fourth and fifth RUs in AU2 to the memory card 2.

Figure 39:
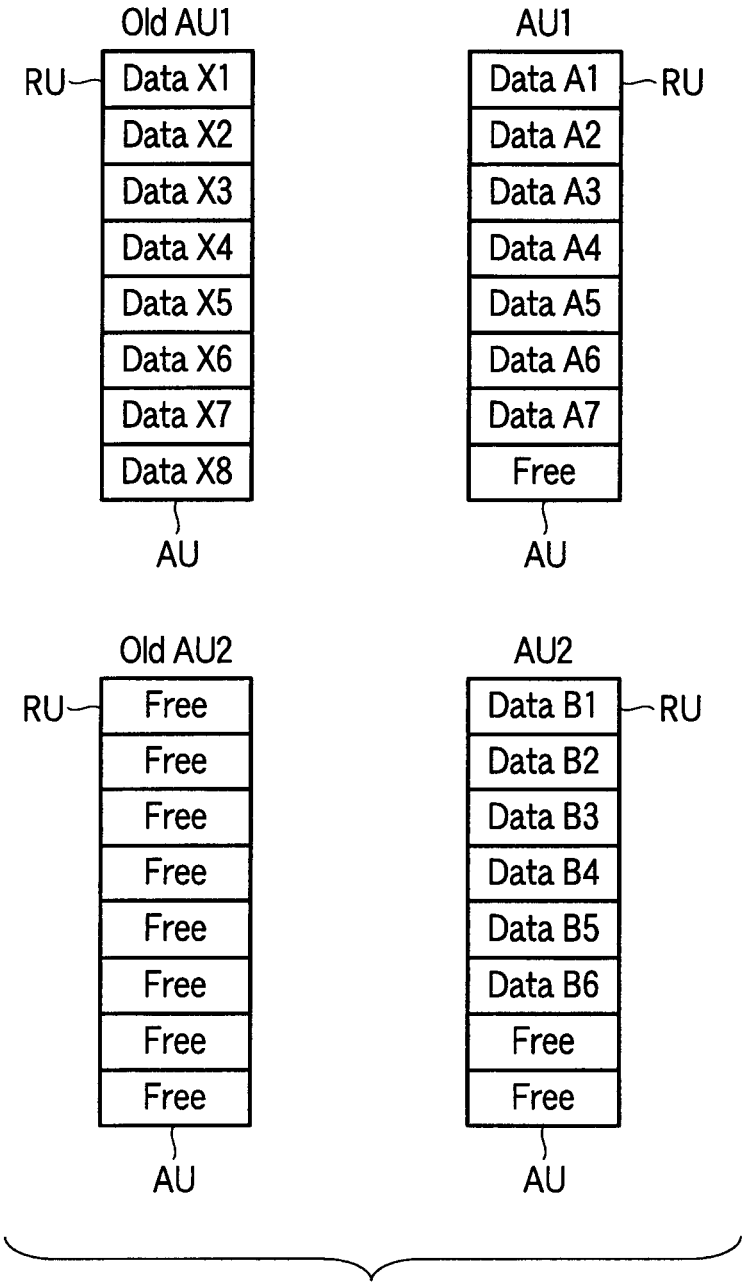
FIG. 39 illustrates a state following FIG. 38.

As shown in FIG. 39, since the memory card 2 maintains work AU2 for AU2, the memory card 2 respectively writes data B4 and B5 in the same fourth and fifth RUs in work AU2 as the RUs in AU2 which are instructed to store data B4 and B5.

As shown in FIG. 38, the host 1 wishes to write data B6 in the sixth RU in AU2. When the host 1 wishes the writing to the RU(s) in the AU including the RU to which the data has been last written, it can perform this by just supplying the write command without supplying the continuation command. In order to perform this writing, as shown in FIG. 34, the host 1 supplies the write command, and then data B6 associated with the sixth RU in AU2 the memory card 2. Upon receipt of this write request, the memory card 2 writes data B6 in the same sixth RU in work AU2 as the RU which is instructed to stores data B6 in AU2.

Since the write request has been completed, as shown in FIG. 34, the host 1 supplies the close command to the memory card 2. In the example of FIG. 34, the argument for specifying the close target AU in the close command specifies all the work AUs, and without a copy is also specified in another argument. Upon receipt of this command, as shown in FIG. 39, the memory card 2 performs the closing processing to work AU1 and AU2, without copying data X8 of the non-updated RU in AU1 (eighth RU) to work AU1.

[3] Third Example

Figure 40:
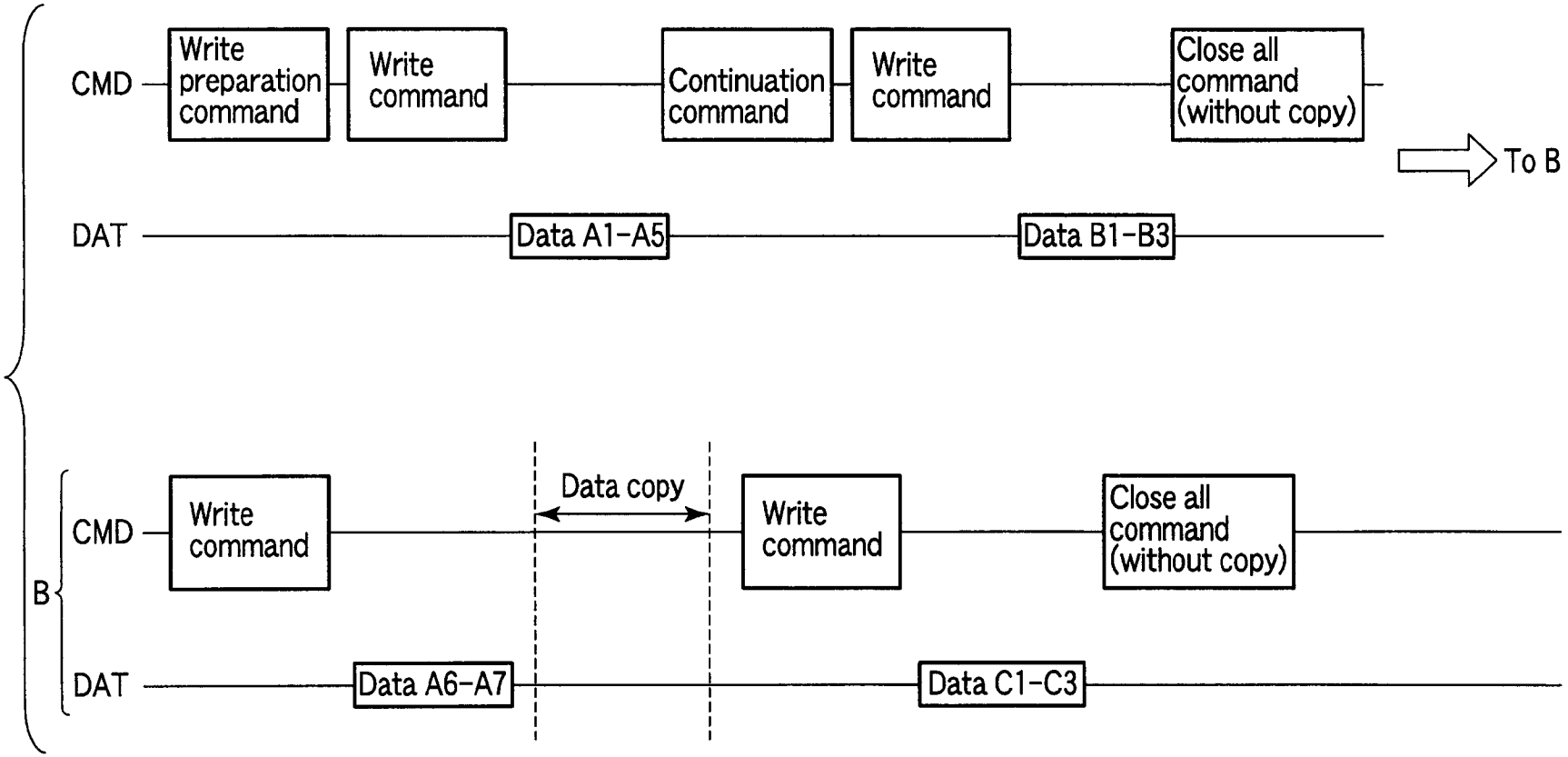
FIG. 40 illustrates a third example of commands and data received by the memory card of the second embodiment.

Another illustrative parallel recording of data for multiple files using the first example will now be described with reference to FIGS. 40 to 47. FIG. 40 illustrates the third example of commands and data received by the memory card according to the second embodiment. FIGS. 41 to 47 illustrate in order one state during writing of the third example in the memory card 2. Data A1 to A7 in these figures is typically video data, and data B1 to B3 and data C1 to C3 picture data. AUs except for work AUs in FIGS. 41 to 48 represent AUs recognized by the file system 12, and also represent AUs of the memory card 2 which store the data in AUs recognized by the file system 12.

As shown in FIG. 40, the memory card 2 shifts to the real-time write enable state with the write preparation command received from the host 1.

Figure 41:
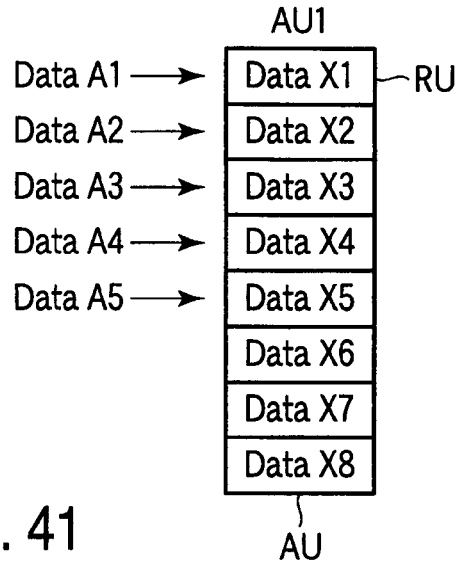
FIG. 41 illustrates a state in the memory card during writing for the third example of the second embodiment.

As shown in FIG. 41, the host 1 wishes to write data A1 to A5 in the first to fifth RUs in AU1. In order to perform this writing, as shown in FIG. 40, the host 1 supplies the write command, and then data A1 to A5 associated with the first to fifth RUs in AU1 to the memory card 2. The first to eighth RUs in AU1 store data X1 to X8.

Figure 42:
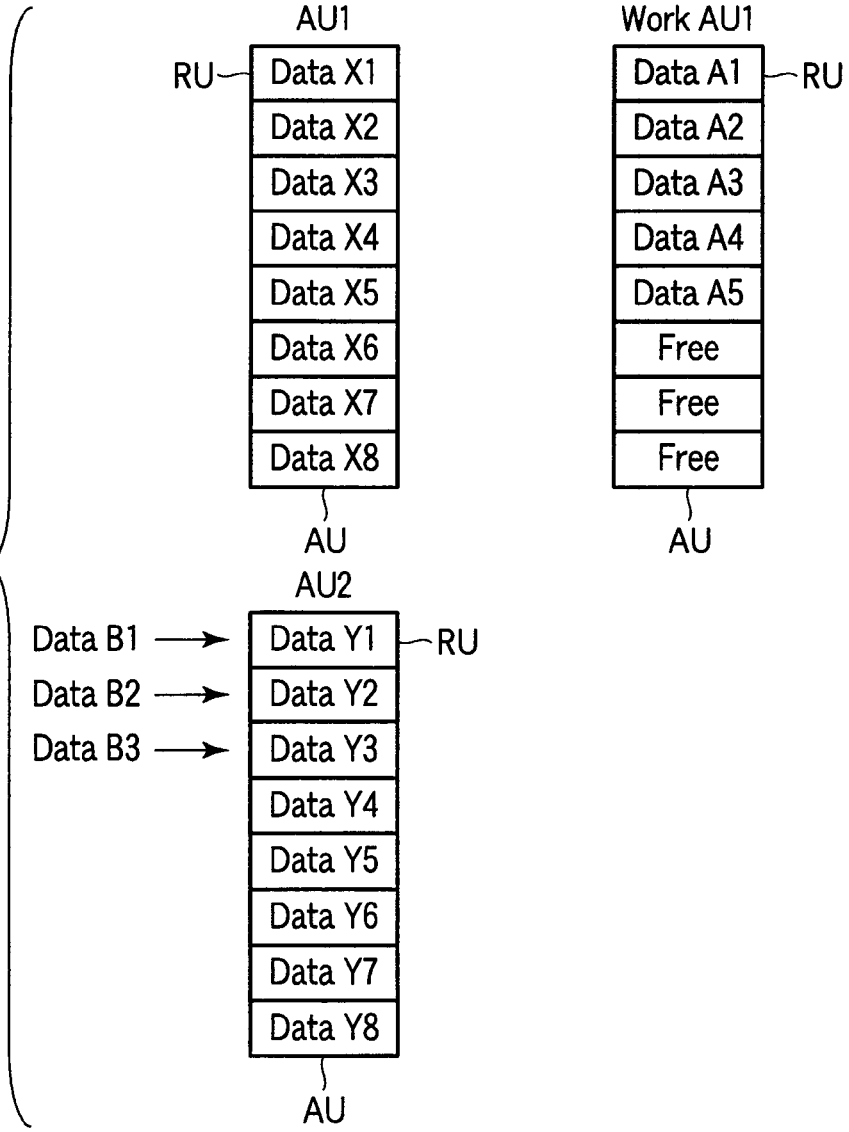
FIG. 42 illustrates a state following FIG. 41.

As described above, since the memory card 2 in the real-time write enable state prepares a new work unless it has previously received the continuation command, the memory card 2 prepares work AU1 for AU1, as shown in FIG. 42. The memory card 2 respectively writes data A1 to A5 in the same first to fifth RUs in work AU1 as the RUs in AU1 which are instructed to store data A1 to A5.

The host 1 wishes to write data for a different file from that partly constituted by data A1 to A5 in parallel. For this reason, as shown in FIG. 40, the host 1 supplies the continuation command to the memory card 2. Upon receipt of the continuation command, as shown in FIG. 42, the memory card 2 maintains work AU1.

As shown in FIG. 42, the host 1 wishes to write data B1 to B3 in the first to third RUs in AU2. In order to perform this writing, as shown in FIG. 40, the host 1 supplies the write command, and then data B1 to B3 associated with the first to third RUs in AU2 to the memory card 2. The first to eighth RUs in AU2 store data Y1 to Y8.

Figure 43:
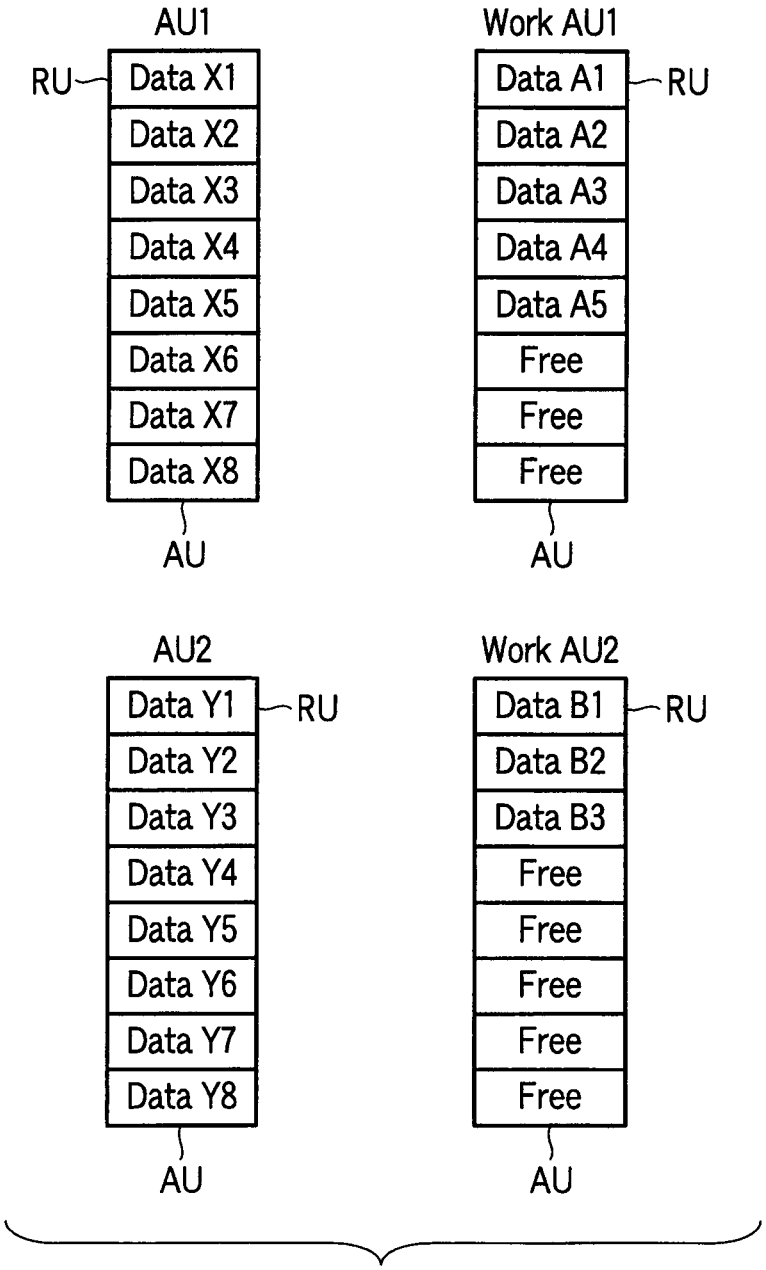
FIG. 43 illustrates a state following FIG. 42.

Since data B1 to B3 belong to a different AU from AU1 to which data has been written previously, as shown in FIG. 43, the memory card 2 prepares work AU2 upon receipt of the write data B1 to B3. The memory card 2 respectively writes data B1 and B3 in the same first to third RUs in work AU2 as the RUs in AU2 which are instructed to store data B1 to B3.

Since the writing of the file constituted by data B1 to B3 has been completed, as shown in FIG. 40, the host 1 supplies the close command to the memory card 2. This close command has an argument specifying without a copy. Upon receipt of this command, as shown in FIG. 44, the memory card 2 performs the closing processing to work AU2 without copying data Y4 to Y8 of non-updated RUs (fourth to eighth RUs) in AU2 which is the target of the writing by the last write command to work AU2.

Figure 44:
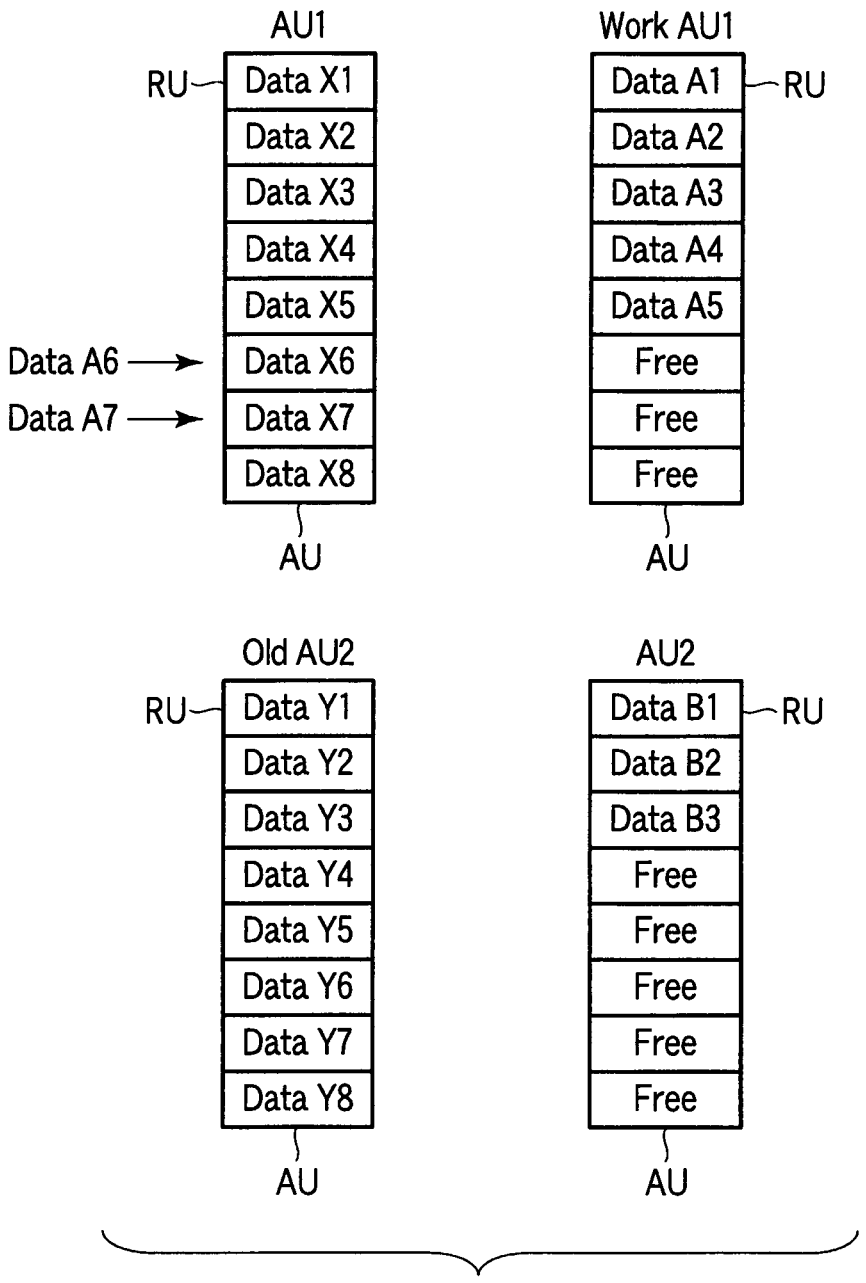
FIG. 44 illustrates a state following FIG. 43.

As shown in FIG. 44, the host 1 wishes to write data A6 and A7 in the sixth and seventh RUs in AU1. In order to perform this writing, as shown in FIG. 40, the host 1 supplies the write command, and then data A6 and A7 associated with the sixth and seventh RUs in AU1 to the memory card 2.

Since the memory card 2 maintains work AU1 for AU1 as shown in FIG. 44, the memory card 2 does not create a new work AU in response to the write command. Rather, the memory card 2 respectively writes data A6 and A7 in the same sixth and seventh RUs in work AU1 as the RUs in AU1 which are instructed to store data A6 and A7.

Figure 45:
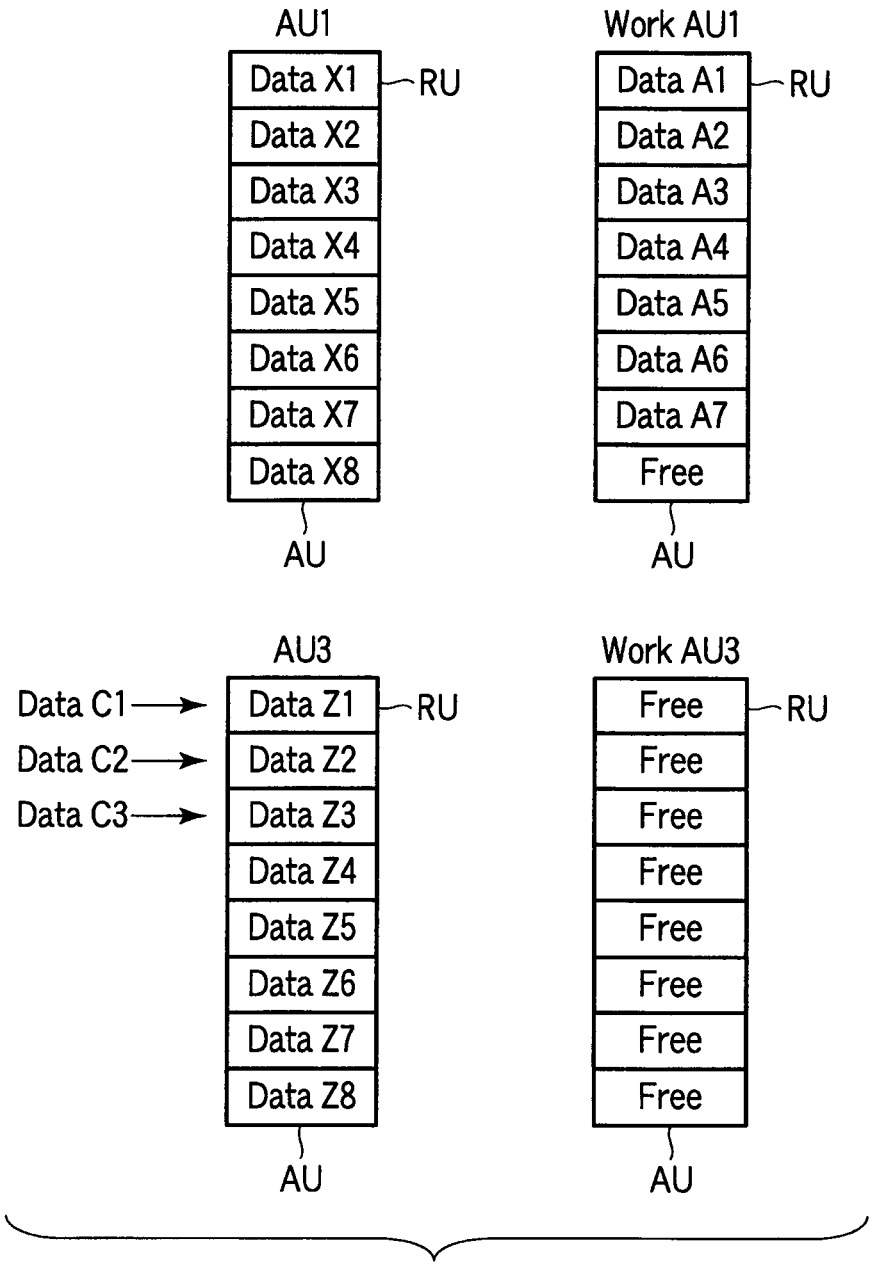
FIG. 45 illustrates a state following FIG. 44.

As the writing of the file which consists of data A1 to A7 has been completed, as shown in FIG. 45, the host 1 wishes to write data C1 to C3 in the first to third RUs in AU3. In order to perform this writing, as shown in FIG. 40, the host 1 supplies the write command, and then data C1 to C3 associated with the first to third RUs in AU3 to the memory card 2. The first to eighth RUs in AU3 store data Z1 to Z8.

Figure 46:
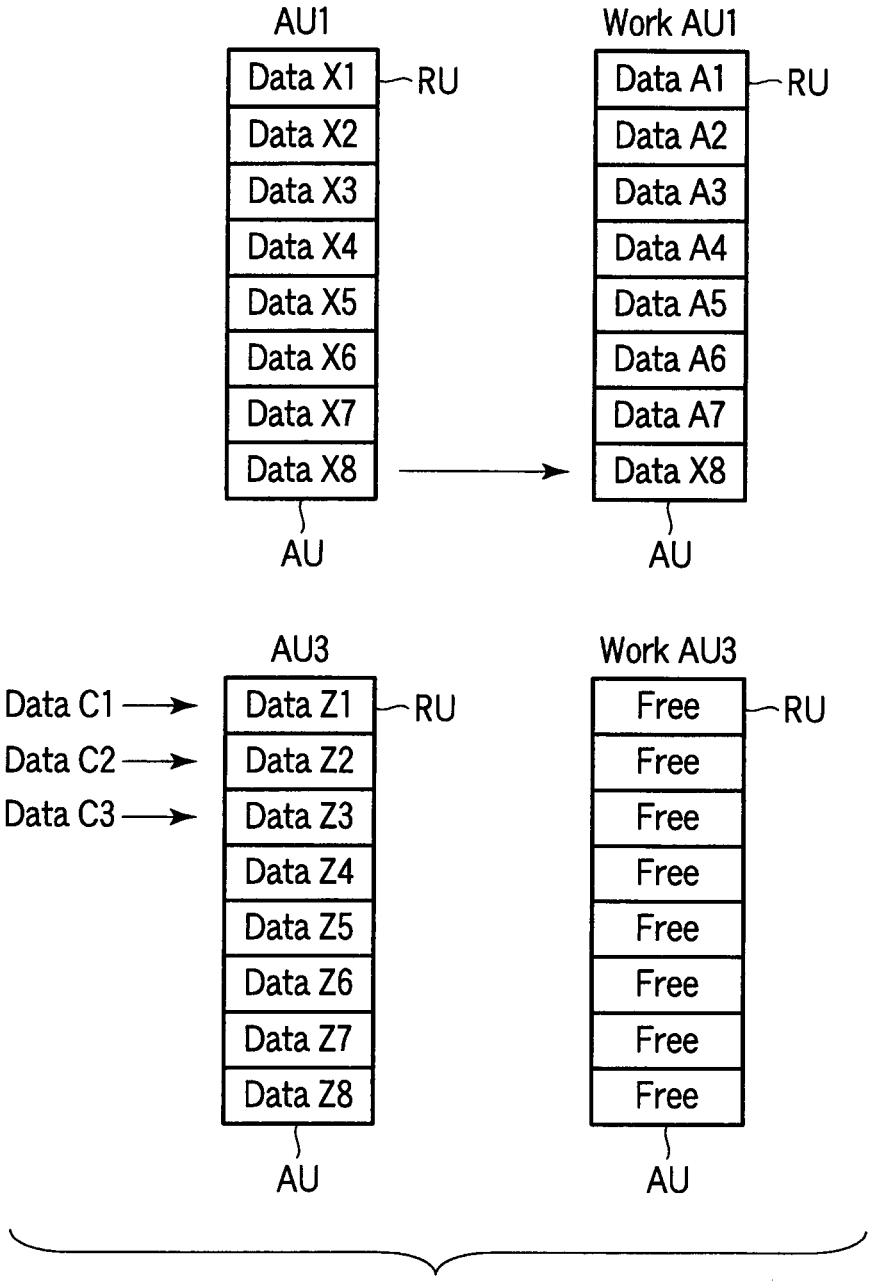
FIG. 46 illustrates a state following FIG. 45.

Data C1 to C3 belong to a different AU from AU1 to which the previous writing has been performed. Moreover, AU1 still includes the non-updated data X8. The memory card 2 which has received the write command in this state without receiving the continuation command copies the non-updated data in AU1 to which the last writing has been performed in the work AU. That is, as shown in FIG. 46, the memory card 2 copies data X8 to the same eighth RU in the work AU as the RU in AU1 to which data X8 is assigned. Then, since the memory card 2 has not received the close command instructing the close processing to work AU1, it does not perform the closing processing to work AU1. Note that since this copying is after the end of the real-time writing, it affects neither writing nor calculation of writing time. Copying of data X8 in AU1 to work AU1 can be specified by the close command. That is, before supply of the write command for writing data C1 to C3, the host 1 supplies the close command with an argument specifying with a copy to the memory card 2. Upon receipt of such a close command, the memory card 2 copies the data of the RU (eighth RU) higher than the last-written RU (seventh RU) in the target AU (AU1) to the same eighth RU in work AU1.

Then, the memory card 2 prepares work AU3 for AU3. Since writing of data C1 to C3 correspond to the writing from the leading RU in AU3, their copy is unnecessary. Therefore, as shown in an FIG. 47, the memory card 2 respectively writes data C1 to C3 in the same first to third RUs in work AU3 as the RUs in AU3 which are instructed to store data C1 to C3.

Figure 47:
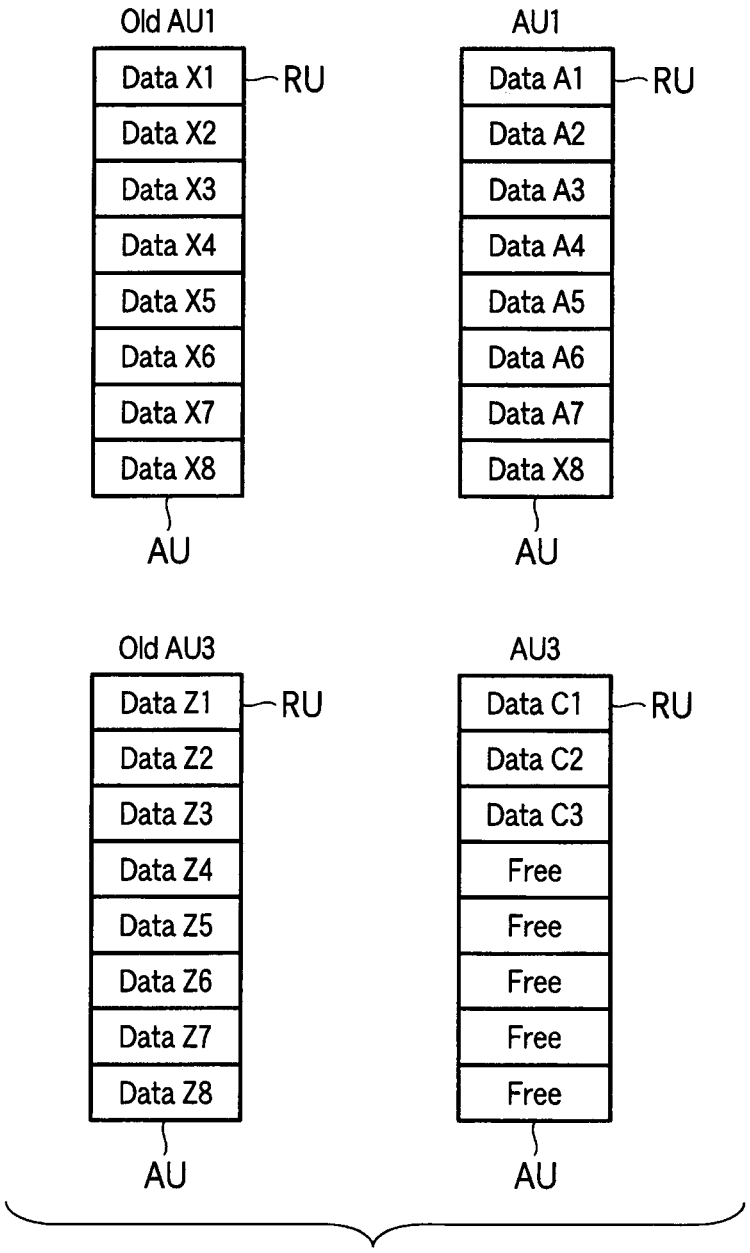
FIG. 47 illustrates a state following FIG. 46.

Since writing the data for the file constituted by data A1 to A7, and the data for the file constituted by data C1 to C3 has been completed, as shown in FIG. 40, the host 1 supplies the close command to the memory card 2. This close command has an argument specifying without a copy and another argument specifying the closing processing to all the AUs (work AU1 and AU3 in this example). Therefore, upon receipt of this command, as shown in FIG. 47, the memory card 2 performs the closing processing to work AU1, and the closing processing to work AU3 without copying data Z4 to Z8 of the non-updated RUs (fourth to eighth RUs) in AU3 to work AU3.

As described above, according to the memory card of the second embodiment, the real-time writing state is defined. Upon receipt of the write command, the memory card in the real-time writing state prepares the work AU which consists of only free RUs and writes data in the RUs in the work AU in the order of the logical addresses of the write data. The speed of writing to such continuous free RUs is the maximum realized by the flash memory 21. The maximum write speed depends on the inherent performance of the flash memory 21 and is almost constant. For this reason, the time required to complete the instructed writing can be easily calculated from the maximum write speed and the number of AUs (RUs) derived from the data size required to be written by the host 1. Such calculation is easy, which requires short time.

Moreover, the continuation command is provided in the memory card according to the second embodiment. With the continuation command, the closing processing is not necessary to a work AU to prepare another work AU. For this reason, providing an exclusive work AU to data for each of two or more separate files allows for recording data for two or more files in parallel.

Note that all the continuation command instructs is to suspend the writing to a created work AU. For this reason, even if the memory card receives the continuation command as in the second example, it writes data in only free RUs without suspending the writing as in the first example.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

[1. A memory device comprising:

a memory which includes memory areas; and a controller configured to, upon receipt of write data, write data in the memory areas while managing correspondence between addresses of write data and memory areas which store corresponding write data, wherein a plurality of the memory areas constitute a management unit, the controller is configured:

to receive a start command and, after the start command, a first write command to a first management unit to perform sequential writes to the first management unit in a sequential mode; and to receive a second write command to a second management unit, the second management unit having an address that is non-sequential with an address of the first management unit, to end the sequential mode to perform writes to the second management unit to invalidate data in the first management unit which has not been updated by writes to the first management unit and to maintain data in the second management unit which has not been updated by writes to the second management unit.]

[2. The device according to claim 1, wherein the controller comprises a register holding information on a speed of data writing to the memory areas.]

[3. The device according to claim 1, wherein upon receipt of a data writing instruction, the controller prepares a work area temporarily secured for an address group which will contain the address of the write data, the write data is written in the work area, and the work area consists of only unwritten memory areas which contain no effective data.]

[4. The device according to claim 1, wherein the controller writes in a first work area first pieces of data which have a predetermined association with each other and have addresses which belong to a first address group, and writes in a second work area second pieces of data which have a predetermined association with each other and have addresses which belong to a second address group.]

[5. The device according to claim 1, wherein the memory is able to have data written in units of one memory area, and is able to have data erased in units of one erase unit which consists of successive memory areas.]

[6. A method of controlling a memory device comprising a memory comprising memory areas and a controller, the method comprising:

upon receipt of write data, writing data in the memory areas while managing correspondence between addresses of the write data and memory areas which store corresponding write data, a plurality of the memory areas constituting a management unit;

receiving a start command and, after the start command, a first write command to a first management unit to perform sequential writes to the first management unit in a sequential mode; and receiving a second write command to a second management unit, the second management unit having an address that is non-sequential with an address of the first management unit, to end the sequential mode to perform writes to the second management unit to invalidate data in the first management unit which has not been updated by writes to the first management unit and to maintain data in the second management unit which has not been updated by writes to the second management unit.]

[7. The method according to claim 6, wherein the controller comprises a register holding information on a speed of data writing to the memory areas.]

[8. The method according to claim 6, wherein upon receipt of a data writing instruction, the controller prepares a work area temporarily secured for an address group which will contain the address of the write data, the write data is written in the work area, and the work area consists of only unwritten memory areas which contain no effective data.]

[9. The method according to claim 6, wherein the controller writes in a first work area first pieces of data which have a predetermined association with each other and have addresses which belong to a first address group, and writes in a second work area second pieces of data which have a predetermined association with each other and have addresses which belong to a second address group.]

[10. The method according to claim 6, wherein the memory is able to have data written in units of one memory area, and is able to have data erased in units of one erase unit which consists of successive memory areas.]

*11. A memory system comprising a memory device and a host device connectable to the memory device, the memory device comprising:*

*a memory which includes memory areas; and*

*a controller configured to, upon receipt of write data, write data in the memory areas while managing correspondence between addresses of write data and memory areas which store corresponding write data, wherein*

*a plurality of the memory areas constitute a management unit,*

*the controller includes an interface for connecting to the host device,*

*the controller is configured to:*

*to perform, upon receipt of a write request including a sequential write start command, a first write command to a first management unit, and write data items having serial addresses in the first management unit, sequential writes of the write data items to the first management unit in a sequential mode, no data item that has been stored in the first management unit before receipt of the write request and has not been updated by the write request being stored in the first management unit, the first write command being received after the sequential write start command without any command therebetween, and the write data items being received after the first write command; and*

*to end, upon receipt of a second write command to a second management unit having an address that is non-sequential with an address of the first management unit in the sequential mode, the sequential mode to perform writes to the second management unit to invalidate data in the first management unit which has not been updated by writes to the first management unit and to maintain data in the second management unit which has not been updated by writes to the second management unit, and*

*the host device is configured:*

*to transmit to the memory device the sequential write start command and the first write command to the first management unit after the sequential write start command, and*

*to transmit to the memory device the second write command to the second management unit after transmitting the first write command.*

*12. The memory system according to claim 11, wherein the controller comprises a register holding information on a speed of data writing to the memory areas.*

*13. The memory system according to claim 11, wherein upon receipt of a data writing instruction, the controller prepares a work area temporarily secured for an address group which will contain the address of the write data, the write data is written in the work area, and the work area consists of only unwritten memory areas which contain no effective data.*

*14. The memory system according to claim 11, wherein the controller writes in a first work area first pieces of data which have a predetermined association with each other and have addresses which belong to a first address group, and writes in a second work area second pieces of data which have a predetermined association with each other and have addresses which belong to a second address group.*

*15. The memory system according to claim 11, wherein the memory is able to have data written in units of one memory area, and is able to have data erased in units of one erase unit which consists of successive memory areas.*

* * * * *